United States Patent [19]

Matsumoto et al.

[11] Patent Number: 5,621,659
[45] Date of Patent: Apr. 15, 1997

[54] CENTRAL CONTROL DEVICE AND OPERATION DEVICES

[75] Inventors: Kazutoshi Matsumoto, Saitama; Hatsuhiko Shinoda, Tokyo; Yosuke Yukihira, Kanagawa; Hiroshi Moriuchi, Saitama, all of Japan

[73] Assignee: Sony Corporation, Tokyo, Japan

[21] Appl. No.: 330,846

[22] Filed: Oct. 27, 1994

[30] Foreign Application Priority Data

Oct. 29, 1993 [JP] Japan ................................... 5-271435

[51] Int. Cl.⁶ .................................................. H03K 17/00
[52] U.S. Cl. .............................. 364/514 R; 340/825.08
[58] Field of Search ................................ 364/937, 514 R, 364/514 C; 340/825.07, 825.08, 825.15, 825.29; 379/40, 272; 395/288; 370/54, 112; 327/365, 396; 439/488, 489

[56] References Cited

U.S. PATENT DOCUMENTS

| | | | |
|---|---|---|---|
| 4,006,461 | 2/1977 | Coulter et al. | 379/40 |
| 4,706,190 | 11/1987 | Bomba et al. | 395/288 |
| 5,113,354 | 5/1992 | Harper | 364/514 C |
| 5,446,680 | 8/1995 | Sekiya et al. | 364/514 R |

Primary Examiner—Emanuel T. Voeltz
Assistant Examiner—Thomas Peeso
Attorney, Agent, or Firm—Jay H. Maioli

[57] ABSTRACT

In a system comprising a central control device and operation devices, wherein connectors are connected to operation device and control, video, and audio signals can be exchanged among the operation devices through multiline cables connected to the connectors or as multiplexed signals, a particular operation device connected to a connector can be identified by detecting the connector inputting a control signal transmitted by the particular operation device and information on pairs, each comprising a connector and operation device connected to the connector, is cataloged in a selector control table stored in a RAM unit embedded in a control means of a central control device. Accordingly, the operation devices can be connected to each other with ease.

12 Claims, 23 Drawing Sheets

FIG. IA
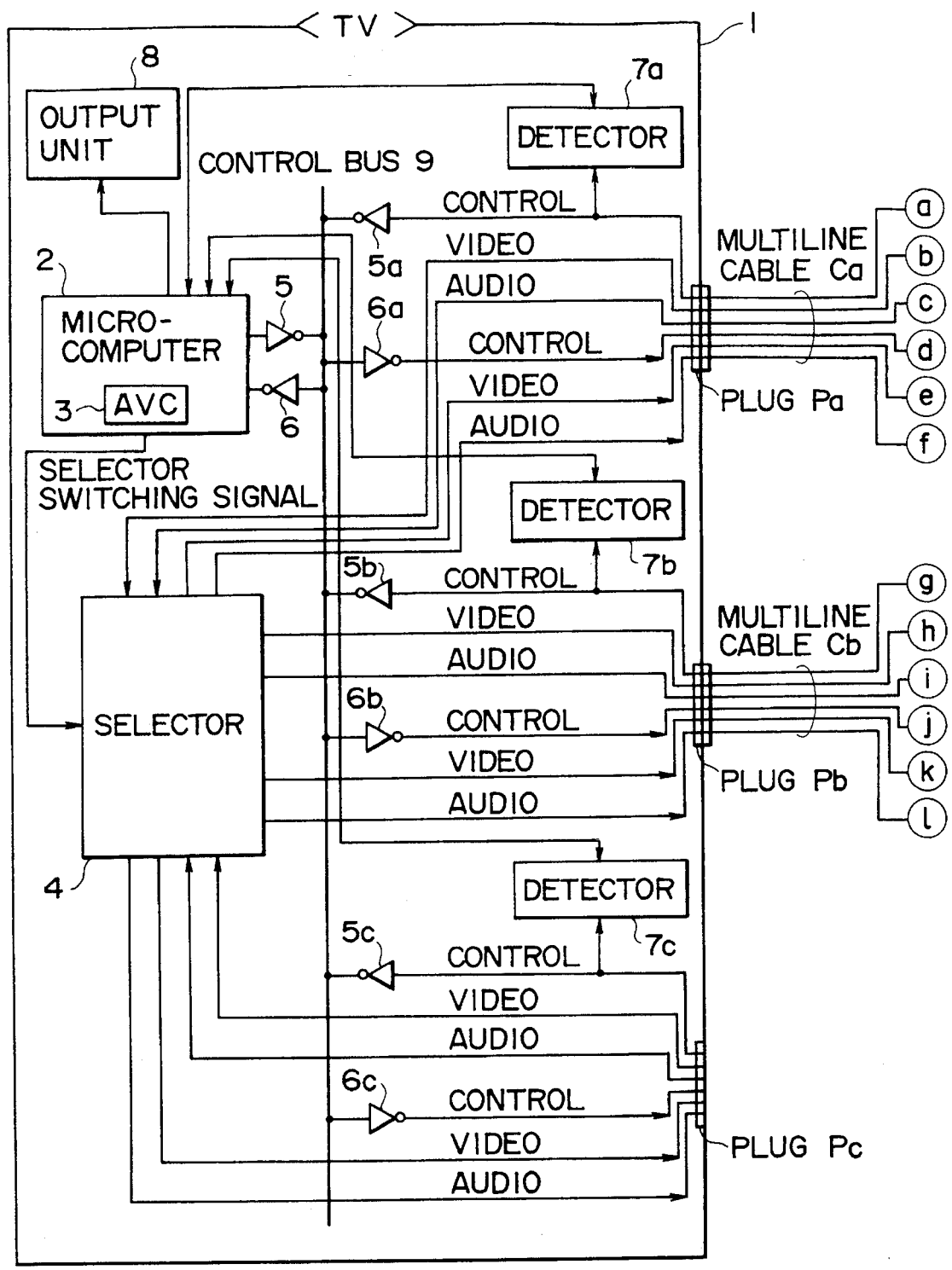

FIG. IB
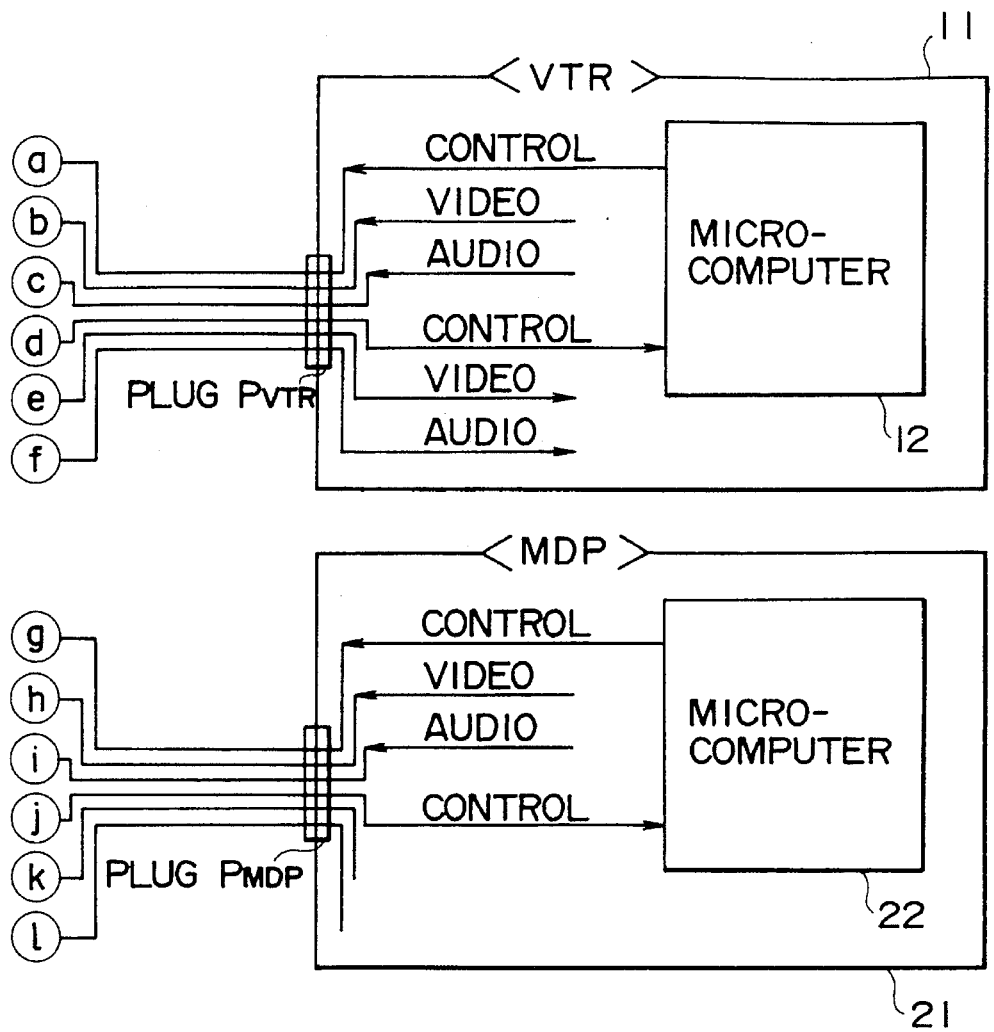

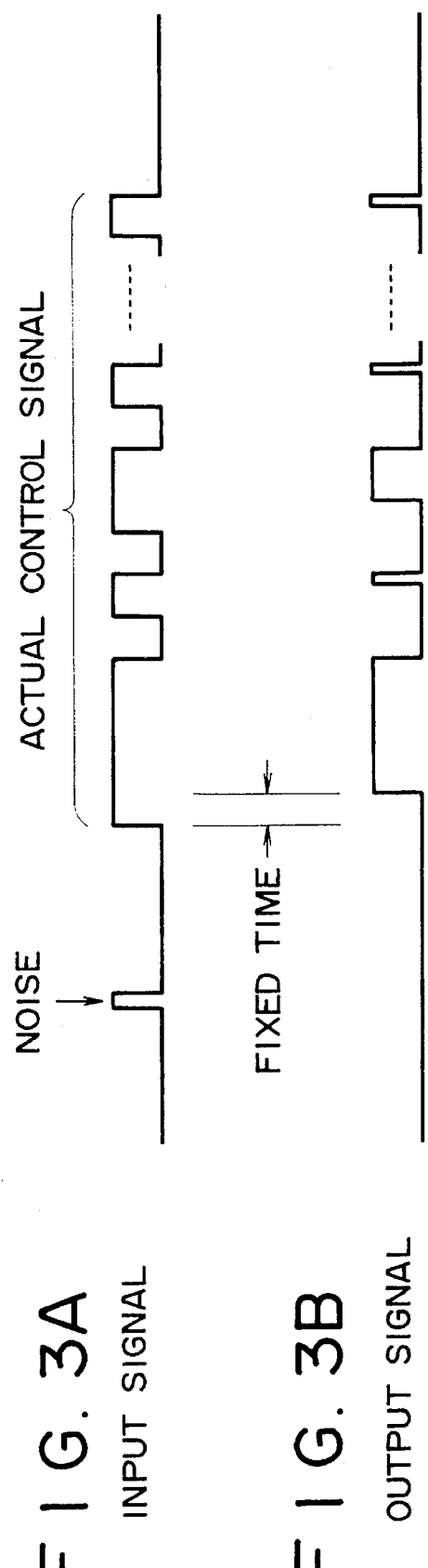
FIG. 3A INPUT SIGNAL
FIG. 3B OUTPUT SIGNAL

F I G. 5A CONTROL SIGNAL
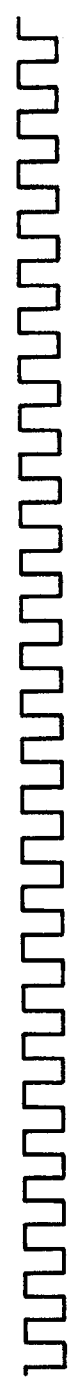
F I G. 5B CLOCK
F I G. 5C COUNTER CONTENTS
F I G. 5D COUNTER OUTPUT
F I G. 5E FLIP-FLOP OUTPUT

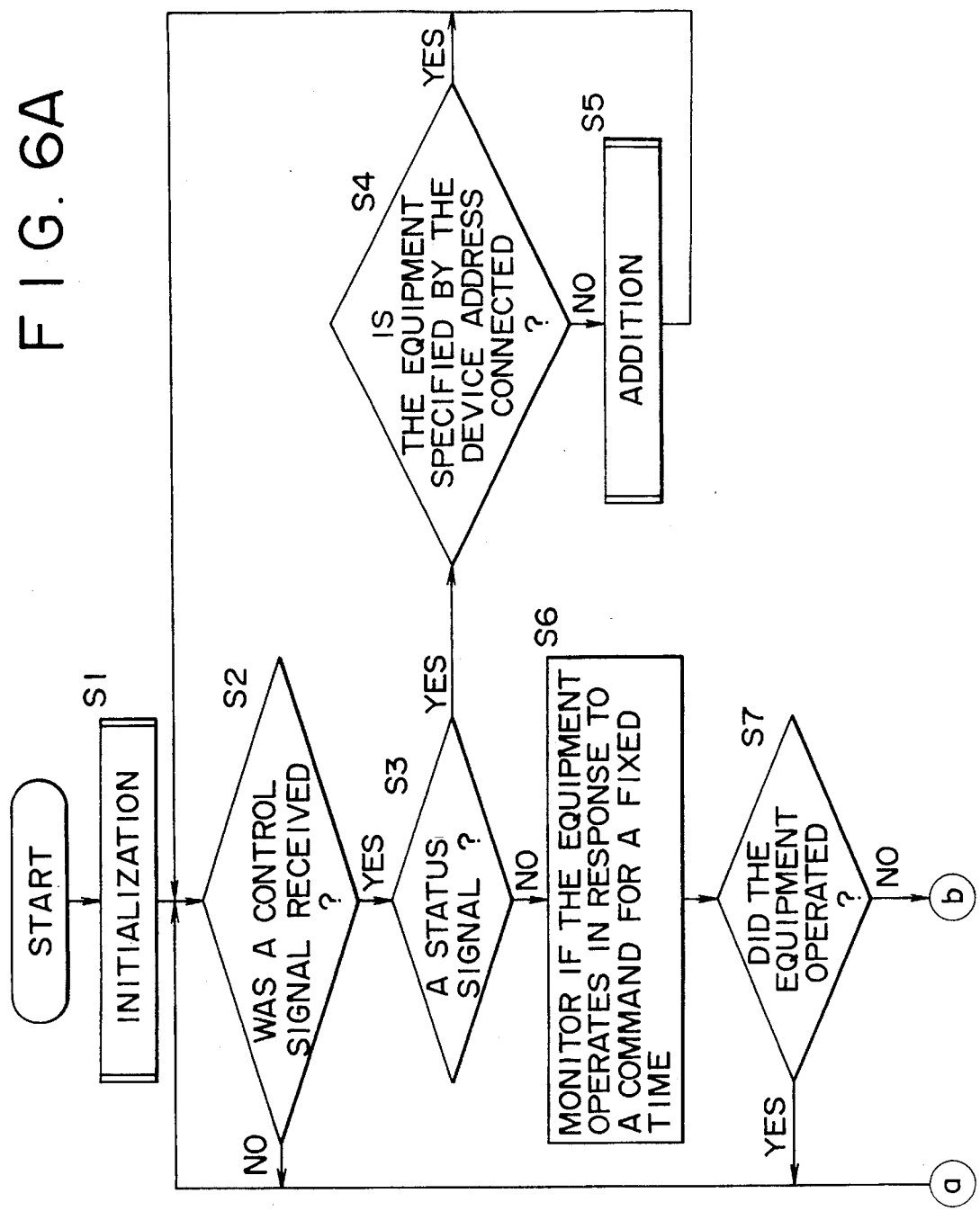

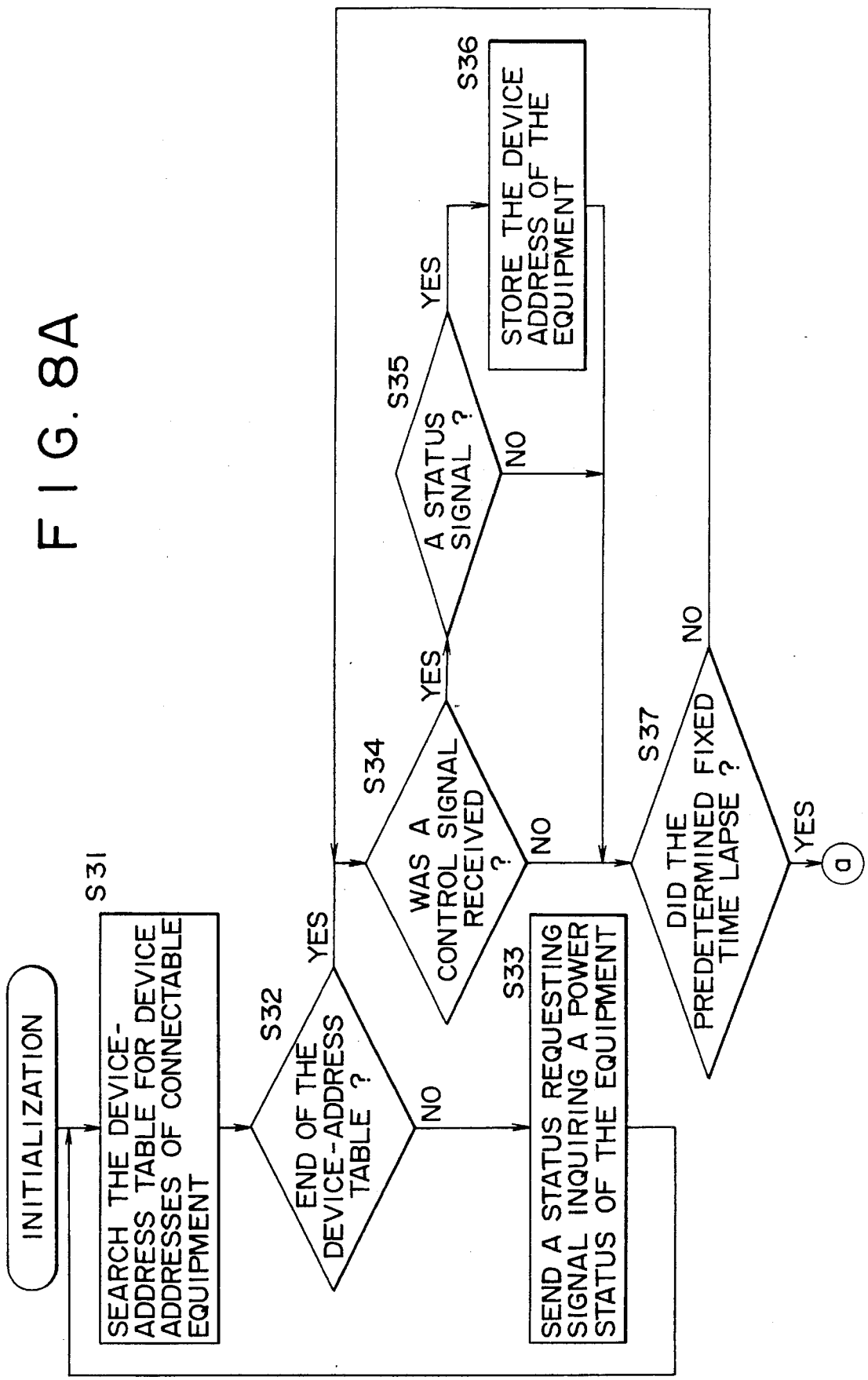

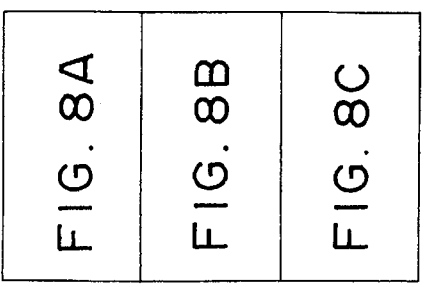
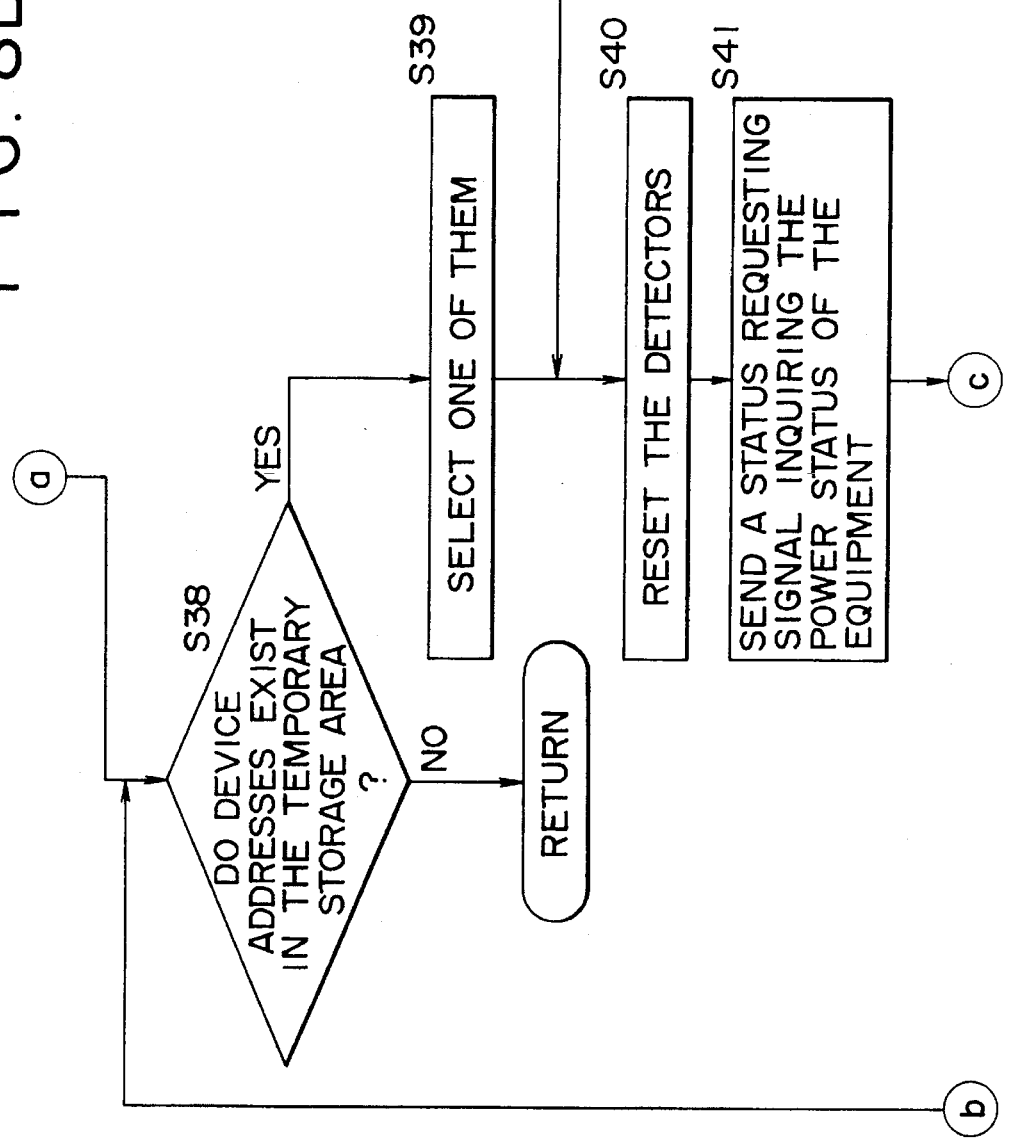
FIG. 8B

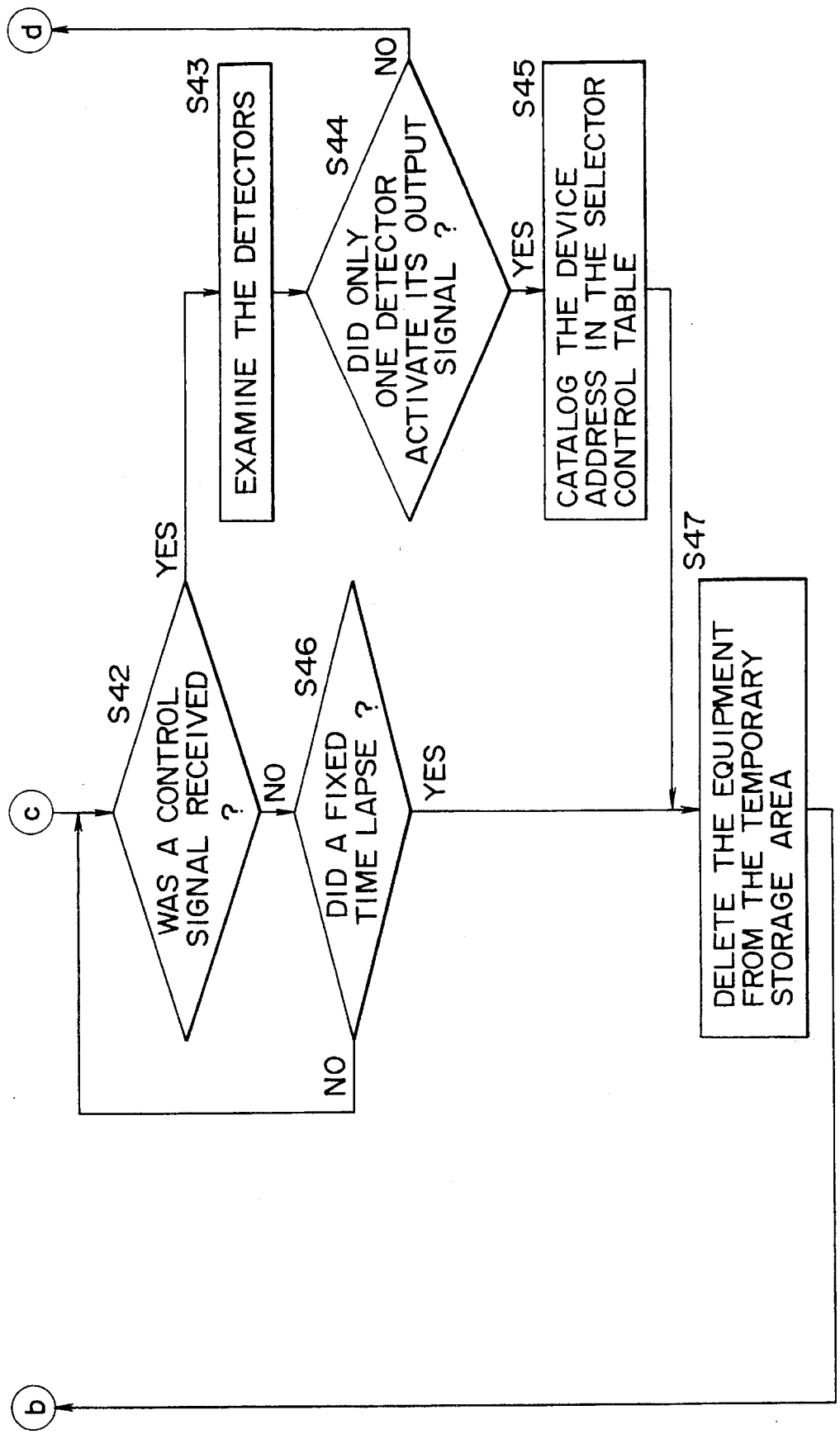

DEVICE-ADDRESS TABLE $VTR_1, VTR_2, \ldots, VTR_n,$
$MDP_1, MDP_2, \ldots, MDP_n,$
$CD_1, CD_2, \ldots, CD_n,$
$TAPE_1, TAPE_2, \ldots, TAPE_n,$
$TUNER_1, TUNER_2, \ldots, TUNER_n,$
$\ldots, EOF$

TEMPORARY STORAGE AREA FOR STORING CONNECTABLE EQUIPMENT

CONNECTED EQUIPMENT

| | |
|---|---|
| 1 | $VTR_1$ |
| 2 | $MDP_1$ |
| 3 | |

SELECTOR CONTROL TABLE

CONNECTED EQUIPMENT

| | |
|---|---|
| PLUG Pa | $VTR_1$ |
| PLUG Pb | $MDP_1$ |
| PLUG Pc | NOT CONNECTED |

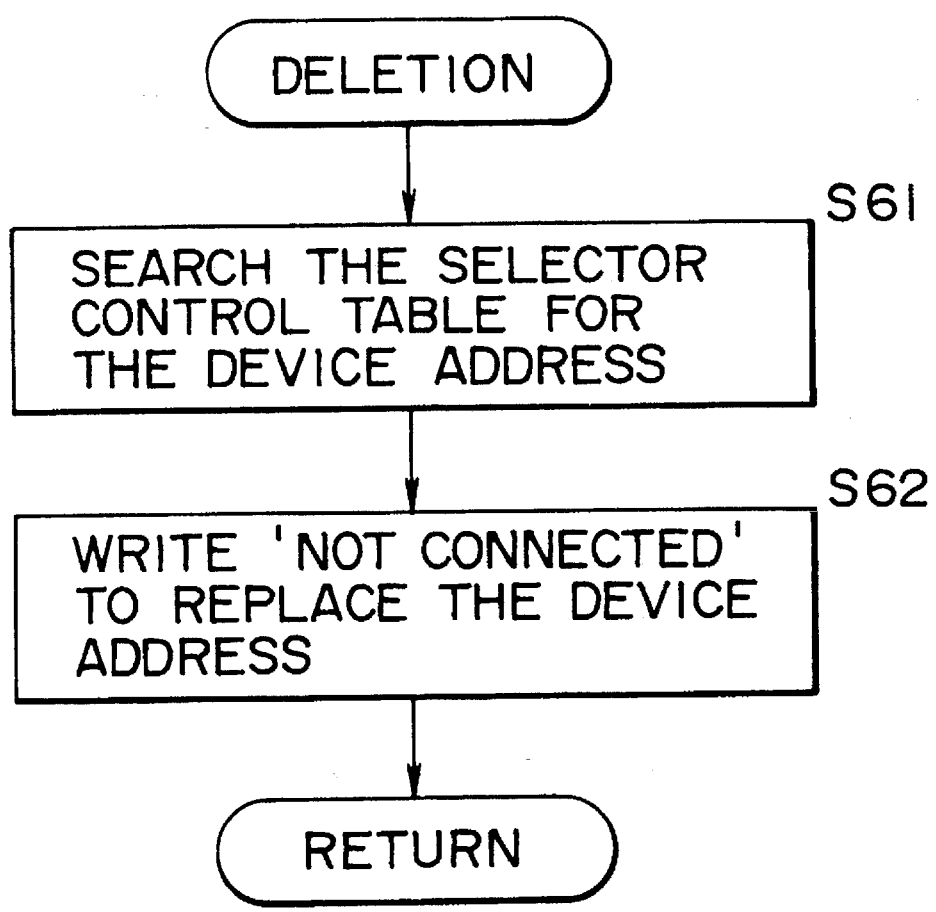

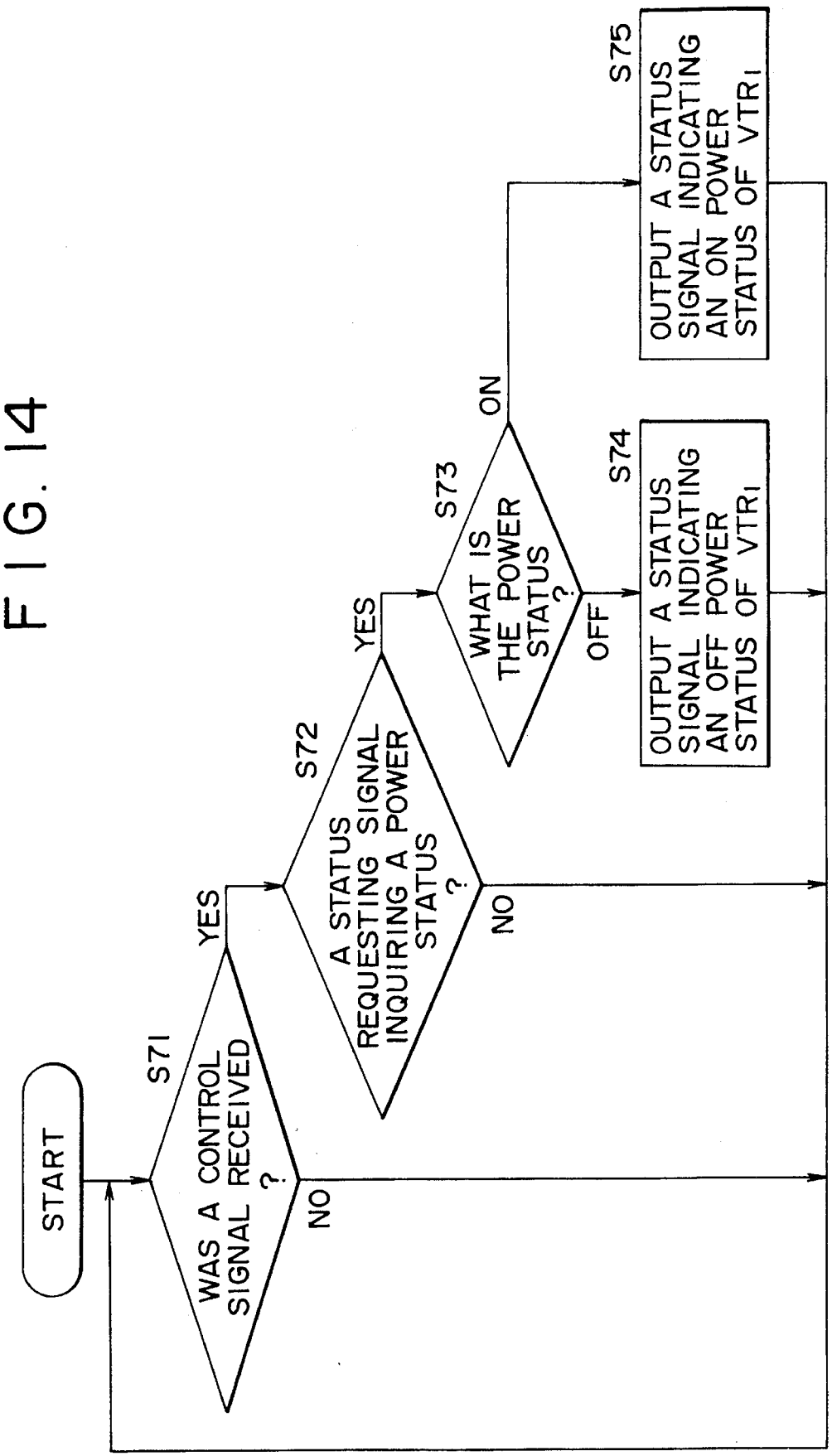

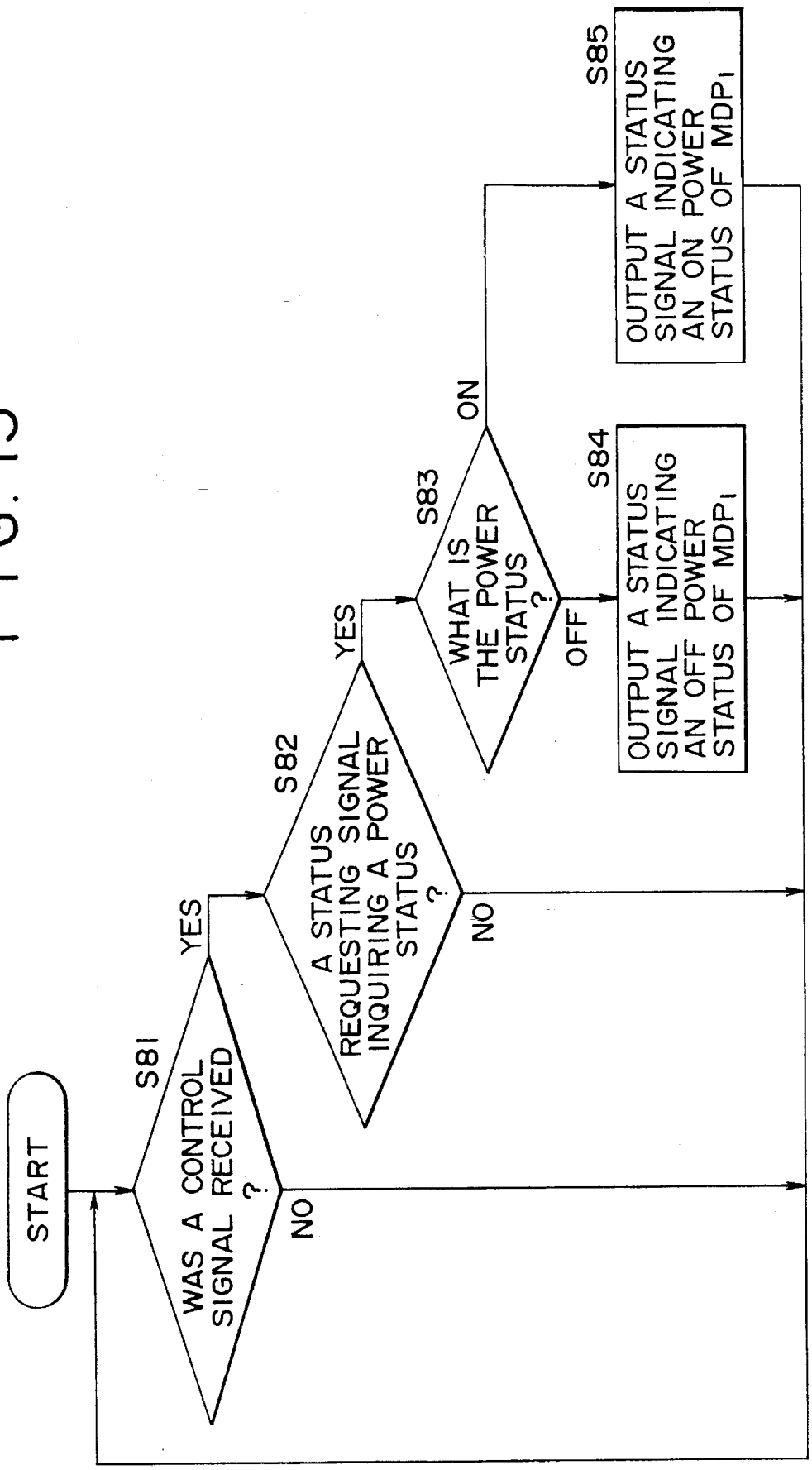

CENTRAL CONTROL DEVICE AND OPERATION DEVICES

BACKGROUND OF THE INVENTION

The present invention relates to an AV selector for changing the connection between pieces of AV equipment such as VTRs (Video Tape Recorders), MDPs (Multi Disk Players) and TVs (television receivers).

In recent years, pieces of AV equipment such as TVs, VTRs, MDPs, AV selectors, speaker systems and amplifiers can be connected to each other by not only video and audio cables for exchanging video and audio signals, respectively, but also by control-signal lines for exchanging control signals. Such connection allows pieces of AV equipment to be integrated into an AV system.

Operations of pieces of AV equipment constituting such an AV system can be interlocked with each other by exchanges of control signals. In other words, when an operation to play back a video or audio signal at a VTR or an MDP is started, for example, a control signal notifying the start of the playback operation is output to a TV or an amplifier and a speaker system. Receiving the control signal, the TV or the amplifier and the speaker system turn on their power, allowing the reproduced video or audio signal to be displayed or to be output.

Typically, the user must build an AV system by himself by connecting pieces of AV equipment to each other while referring to user manuals and checking signal names of the pieces of AV equipment to be connected which are normally written in close proximity to connectors of the AV equipment. As a result, where many pieces of AV equipment are to be connected to each other, a problem arises in that the task is arduous.

On top of that, the pieces of AV equipment may not be connected correctly, resulting in an AV system that does not operate normally in an interlocked manner. As a result, another problem arises in that the user thinks mistakenly that a malfunction has occurred in the AV equipment.

Furthermore, there is an AV system which can check the connection among pieces of AV equipment constituting the AV system and notify the user of any incorrect connection. An example of such an AV system is disclosed in Japanese Patent Laid-Open No. H03-66089 dated Jul. 31, 1989.

In the case of the AV system disclosed to the public through the patent described above, however, an alarm sound is merely generated along with an alarm message displayed on a screen by means of an audio synthesis unit and a character generating circuit, respectively, for a detected miswired external signal, allowing the incorrect wiring state of an external electronic device to be identified in a simple way.

The configuration of the AV system is described in concrete terms as follows.

When an external audio (A) or video (V) signal does not match a connector pin or is not available due to incorrect wiring, a signal detection unit controlled by a signal output by an A/N control logic unit detects the state of the video (V) or audio (A) signal output by an A/V switch unit. The A/N control logic unit outputs an incorrectly wired signal, applying the incorrectly wired signal to a pin of an audio switch unit. The incorrectly wired signal is also applied to a pin of remote-control adjustment unit as well. A signal output by the remote-control adjustment unit is then supplied to a pin of the audio switch unit through the audio synthesis unit before being transmitted to a speaker for generating a warning sound through an audio-signal processing unit and an amplifier. In addition, the signal output by the remote-control adjustment unit is also supplied to the character generating circuit for controlling a CRT driver. The CRT driver, in turn, displays characters 'MISWIRING' on the screen of a CRT.

Such an AV system requires a signal generating circuit for producing signals used for checking video and audio cables connecting the pieces of AV equipment to each other. In addition, a control signal for controlling the signal generating circuit is also required to control signals for controlling the interlocked operations of the AV equipment. As a result, still another problem arises due to the fact that the AV system becomes large in size and the control becomes complicated.

In addition, the complicated control in turn gives rise to still another problem that it takes time to check the connection among the pieces of AV equipment.

On the other hand, connectors are provided at both ends of each of video and audio cables as well as control lines for connecting pieces of AV equipment. By fixing each cable/line connector into a connector provided on the AV equipment, electrical connection is established among the pieces of AV equipment.

When considering connection between a TV and a VTR, for example, it is thus necessary to connect a video input connector, an audio input connector, a video output connector, an audio output connector and a control signal connector of the TV to a video output connector, an audio output connector, a video input connector, an audio input connector and a control signal connector of the VTR, respectively, by cables.

In this case, however, a connector attached to an end of a cable is generally not discriminative. That is to say, the connector is not designed to handle a plurality of signals. As a result, a connector can be fixed into a wrong connector. To be more specific, the audio output connectors of the TV and the VTR can be plugged in each other mistakenly, for example, even if the video input connector of the TV is fixed into the video output connector of the VTR correctly.

When there are many incorrectly wired pieces of AV equipment, it is not easy to correct the wiring while verifying the connection even if the user is notified of the existence of incorrect wiring as described above.

SUMMARY OF THE INVENTION

In order to solve the above mentioned problem, it is an object of the present invention to provide an AV system which is built built with ease without causing the user to feel any irritation.

According to one aspect of the present invention, there is provided a system comprising a central control device and operation devices connected to said central control device wherein said central control and operation devices can each output and/or input video and/or audio signals and operate in an interlocked manner by exchanging control signals among said central control and operation devices, the improvement wherein:

said central control device comprises
a first control means for generating a first control signal requesting each of said operation devices to transmit a predetermined signal indicating a status of each of said operation devices and outputting the first control signal to each of said operation devices at initialization, a plurality of connectors for exchanging the first control, video and audio signals with said operation devices and a storage means for storing information on addresses of said operation devices corresponding to numbers of said connectors associated with said operation devices; and said operation devices each comprise a connector for exchanging the first control, video and audio signals with said central control device and a second control means for generating a second control signal, which is a signal for indicating a status of said operation device, in response to the first control signal and outputting the second control signal to said central control device; wherein when said first control means receives the second control signal, said operation device outputting the second control signal is judged to be connected to said central control device.

According to another aspect of the present invention, there is provided a central control device for exchanging video, audio and control signals with operation devices, said central control device comprising a first control means for generating a first control signal requesting each of said operation devices to transmit a predetermined signal indicating a status of each of said operation devices and outputting the first control signal to each of said operation devices at initialization, a plurality of connectors for exchanging the control, video and audio signals with said operation devices and a storage means for storing addresses of said operation devices corresponding to numbers of said connectors associated with said operation devices.

According to a further aspect of the present invention, there is provided an operation device exchanging video, audio and control signals with a central control device connected to said operation device, said operation device comprising a connector for exchanging the control, video and audio signals with said central control device and a second control means for generating a second control signal, which is a signal for indicating a status of said operation device, and outputting the second control signal to said central control device in response to a first control signal received from said central control device, which requests each of said operation devices to transmit a signal indicating a status of each of said operation devices.

The system comprising the central control device and the operation devices with a configuration described above can find out which of the connectors has received a particular control signal output by a particular piece of the operation devices connected to one of the connectors, each designed to allow control, video and audio signals to be exchanged either through a multiline cable or as a multiplexed signal, and store information on pairs each comprising one of the connectors detected to have received the particular control signal and the particular piece of the operation devices outputting the particular control signal. In addition, the system comprising the central control device and the operation devices is designed to have a capability of changing connection among the pieces of operation device on the basis of the control signal and information stored in the selector control table as the storage means. As a result, pieces of the operation device can be identified, allowing the connection among the pieces of operation devices to be changed correctly without regard to what kinds of operation devices are connected to the connectors.

The first control means of the central control device carries out control to output control signals to the operation devices and also requests the operation device to transmit control signals as well. Pieces of operation devices can be interlocked with each other at a high degree of accuracy in controlling operations of the operation devices.

In addition, in order to verify the connection among pieces of operation devices, the first control means of the central control device performs control to output control signals to the operation devices at power on. As a result, the user does not have to carry out the verification of the connection by himself which usually causes the user to feel irritation.

In addition, information stored in the selector control table as the storage means can be output in order to notify the user of the current state of the connection.

BRIEF DESCRIPTION OF THE DRAWINGS

FIGS. 1A & 1B are block diagrams showing the configuration of an embodiment implementing a television receiver (TV) 1 employing an AV selector provided by the present invention;

FIGS. 3A and 3B are diagrams used for explaining a method of detecting a control signal adopted in detectors 7a to 7c employed in the embodiment shown in FIG. 1;

FIGS. 5A to 5E are timing charts used for explaining operations of the detectors 7a to 7c shown in FIG. 4;

FIGS. 6A & 6B are flowchart used for explaining operations of a microcomputer 2 employed in the TV 1 of the embodiment shown in FIG. 1;

FIGS. 8A & 8C is are more detailed flowcharts of initialization carried out at a step S1 of the flowchart shown in FIG. 6;

FIG. 13 is a more detailed flowchart of deletion processing carried out at a step S13 of the flowchart shown in FIG. 6;

FIG. 14 is a flowchart used for explaining operations of the microcomputer 12 employed in a VTR 11 of the embodiment shown in FIG. 1;

FIG. 15 is a flowchart used for explaining operations of the microcomputer 22 employed in an MDP 21 of the embodiment shown in FIG. 1;

DESCRIPTION OF THE PREFERRED EMBODIMENTS

Figure 2A:
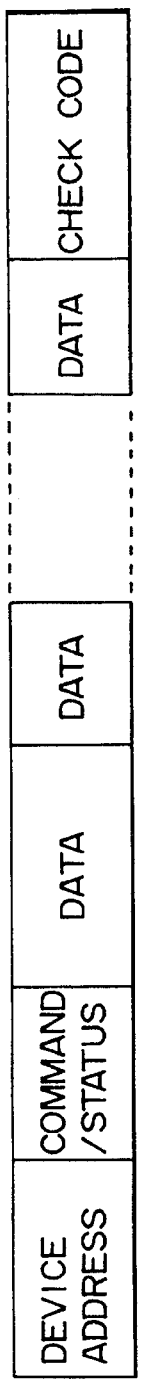
FIGS. 2A to 2E are diagrams showing a format of control signals exchanged in the embodiment shown in FIG. 1.

FIG. 1 is a block diagram showing the configuration of an embodiment implementing an AV in accordance with the present invention. The AV system comprises a VTR (Video Tape Recorder) 11 and an MDP (Multi Disk Player) 21 in addition to the TV 1. The TV 1 also serves as a so-called AV central control (or a central control device) for interlocking operations of the TV 1 and the VTR 11 as well as the MDP 21 (the so-called operation devices) through exchanges of control signals among the TV 1, the VTR 11 and MDP 21.

It should be noted that, in the TV 1, a microcomputer 2 is connected to control lines for routing control signals through a control bus 9 as will be described later. In other words, the microcomputer 2 is connected to the control lines in a bus based configuration. Instead of the bus configuration, for example, the microcomputer 2 can also be connected to control lines for routing control signals directly.

In comparison with the direct connection, however, the bus based configuration for connecting the microcomputer 2 to control lines for routing control signals has the following advantages:

(1) It is not necessary to modify the design of the microcomputer 2 even if the number of plugs on the TV 1 to be described later is changed.

(2) A system program executed on the microcomputer 2 is also easy to design as well.

In order to connect AV equipment such as the VTR 11 and the MDP 21 to the TV 1, three (or three sets of) plugs (or connectors) Pa to Pc are provided. Each of the plugs Pa to Pc has at least nine pins: a control-signal input pin, a control-signal output pin, a video-signal input pin, a video-signal output pin, an audio-signal input pin for a left channel, an audio-signal input pin for a right channel, an audio-signal output pin for the left channel, an audio-signal output pin for the right channel and a GND (ground) pin. The nine pins of each the plugs Pa to Pc allow control, video and audio signals to be exchanged between the TV 1 and each piece of AV equipment through a multiline cable.

The video-signal input pin, the video-signal output pin, the audio-signal input pin for the left channel, the audio-signal input pin for the right channel, the audio-signal output pin for the left channel, and the audio-signal output pin for the right channel of each of the plugs Pa to Pc are connected to a selector 4 employed in the TV 1 through signal lines.

It should be noted that, in actuality, audio signals require two signal lines for the left and right channels, respectively. However, only one single signal line for both the left and right channels is shown in the figure. In addition, a signal line for the GND pin is omitted.

The selector 4 is controlled by an AVC (AV controller) 3 embedded in the microcomputer 2. To be more specific, connections among the plugs Pa to Pc are controlled by the AVC 3. That is to say, a video or audio signal input through a plug can be output to another plug by properly connecting a signal line receiving the input signal to a proper signal line for outputting the received signal.

It should be noted that the TV 1 includes TV blocks for carrying out normal operations of an ordinary TV but these TV blocks are not shown in the figure. These TV blocks are also connected to the selector 4. The selector 4 also controls additional connection of these TV blocks to the plugs Pa to Pc.

The control-signal input pins and the control-signal output pins of the plugs Pa to Pc are connected to a control bus 9 through bus buffers 5a to 5c and 6a to 6c, respectively. The control bus 9 is further connected to the microcomputer 2 through bus buffers 5 and 6.

Figures 9, 10, 11:
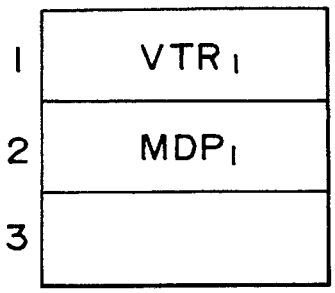
FIG. 9 is a diagram showing a device-address table stored in advance in the microcomputer 2 employed in the embodiment shown in FIG. 1.
FIG. 10 is a diagram showing typical information stored in a temporary storage area allocated in the microcomputer 2 employed in the embodiment shown in FIG. 1.
FIG. 11 is a diagram showing a selector control table.

In addition to the AVC 3 for controlling the selector 4 as described earlier, the microcomputer 2 comprises, a CPU 2c, a ROM unit 2a and a RAM unit 2b. The ROM unit 2a is used for storing a system program and initial values such as addresses of pieces of AV equipment shown as data in a table of FIG. 9 and a device address of the TV 1. The table shown in FIG. 9, to be described later, is called a device-address table. On the other hand, the RAM unit 2b is used for storing data required for operations of the CPU 2c and other devices such as selector control data shown in a table of FIG. 11 which will also be described later. The table shown in FIG. 11 is called a selector control table. The CPU 2c executes predetermined operations in accordance with the system program stored in the ROM unit 2a.

In accordance with control signals received through the control-signal input pins of the plugs Pa to Pc, the bus buffers 5a to 5c, the control bus 9 and the bus buffer 6, the microcomputer 2 controls the AVC 3. In addition, the microcomputer 2 also outputs control signals for controlling other pieces of AV equipment connected to the plugs Pa to Pc through the bus buffer 5, the control bus 9, the bus buffers 6a to 6c and the control-signal output pins of the plugs Pa to Pc.

Furthermore, the microcomputer 2 also controls output units 8 comprising, among other components, speakers and a display unit displaying predetermined information.

The control-signal input pins of the plugs Pa to Pc are connected not only to the microprocessor 2 but also to detectors 7a to 7c, respectively. As will be described later, the detectors 7a to 7c each detect whether or not control signals coming from the plugs Pa to Pc, respectively, are present. If an incoming control signal is detected, a detection signal is output to the microcomputer 2.

In the AV system shown in FIG. 1, the plugs Pa and Pb of the TV 1 are connected to a plug PVTR Of the VTR 11 and a plug $P_{MDP}$ of the MDP 21 through multiline cables Ca and Cb, respectively.

The plugs $P_{VTR}$ and $P_{MDP}$ of the VTR 11 and the MDP 21 have the same pin configuration as the plugs Pa to Pc of the TV 1 described earlier. The cables Ca and Cb each comprise nine control lines which are bundled to form a single multiline cable. A connector is attached to each end of the multiline cables Ca and Cb. The connector comprises nine pins which match the nine pins of any plug Pa, Pb, Pc, $P_{VTR}$ or $P_{MDP}$ described earlier: the control-signal input pin, the control-signal output pin, the video-signal input pin, the video-signal output pin, the audio-signal input pin for the left channel, the audio-signal input pin for the right channel, the audio-signal output pin for the left channel, the audio-signal output pin for the right channel and the GND (ground) pin.

It should be noted that the ground lines of the multiline cables Ca and Cb are not shown in the figure among their signal lines. In addition, two signal lines for the two input audio signals for the L and R channels and two signal lines for the two output audio signals for the L and R channels are each shown as a single line.

Much like the TV 1, the VTR 11 also comprises a microcomputer 12 and VTR blocks, not shown in the figure, for carrying out normal operations of an ordinary VTR. The microcomputer 12 is connected to the control-signal input and output pins of the plug $P_{VTR}$. The microcomputer 12 comprises, among other components, a CPU 12c, a ROM unit 12a and a RAM unit 12b. The ROM unit 12a is used for storing a system program and initial values such the device address of the VTR 11 to be described later. On the other hand, the RAM unit 12b is used for storing data required for operations of the CPU 12c and other devices. The CPU 12c executes predetermined operations in accordance with the system program stored in the ROM unit 12a. Receiving a control signal through the control-signal input pin of the plug $P_{VTR}$, the microcomputer 12 controls operations of the VTR blocks. In addition, the microcomputer 12 also outputs a control signal indicating the states of the VTR blocks. The VTR blocks are connected to the video-signal input pin, the video-signal output pin, the audio-signal input pin for the left channel, the audio-signal input pin for the right channel, the audio-signal output pin for the left channel and the audio-signal output pin for the right channel of the plug $P_{VTR}$.

Much like the TV 1, the MDP 21 also comprises a microcomputer 22 and MDP blocks, not shown in the figure, for carrying out normal operations of an ordinary MDP. The microcomputer 22 is connected to the control-signal input and output pins of the plug $P_{MDP}$. Much like the microcomputer 12 of the VTR 11, the microcomputer 22 controls operations of the MDP blocks in accordance with a control signal received through the control-signal input pin of the plug $P_{MDP}$. In addition, the microcomputer 22 also outputs a control signal indicating the states of the MDP blocks.

The MDP blocks do not have functions for recording video and audio signals. In the MDP 21, the video input pin and the audio input pins for the left and right channels of the plug $P_{MDP}$ are therefore not used. Typically, these unused pins are kept at a high-impedance state.

In the AV system with the configuration described above, the TV 1, the VTR 11 and the MDP 21 are interlocked with each other by exchanges of control signals having a typical format shown in FIG. 2A.

As shown in the figure, a control signal comprises a device address at the head thereof, a command/status following the device address, necessary data following the command/status and a check code at the end thereof. The command/status is either a command issued to an AV unit or a status of the AV equipment. A control signal having a command or a status in the command/status field thereof is called a command or status signal. The check code is used for error detection and/or correction purposes.

Here, a device address is assigned in advance to a piece of AV equipment such as the TV 1, VTR 11 and MDP 21 for distinguishing the piece of AV equipment from another. In the case of the embodiment, device addresses 'TV1', 'VTR' and 'MDP1' are assigned to the TV 1, VTR 11 and MDP 21, respectively. The device addresses 'TV1', 'VTR' and 'MDP1' are stored in the ROM units 2a, 12a and 22a of the microcomputers 2, 12 and 22, respectively.

It should be noted that, where more than one piece of AV equipment in an AV system have identical device addresses, the TV 1 which also serves as an AV central control modifies the identical device addresses so that they become different from each other.

Figure 2B:
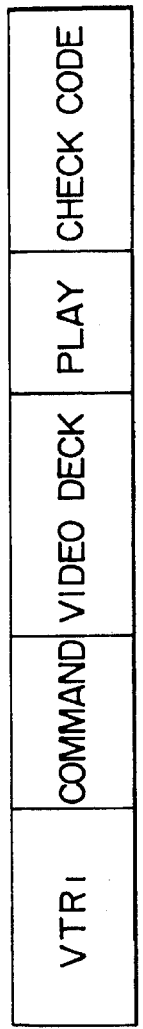

Typically, the VTR blocks of the VTR 11 comprise, among other functional blocks, a video-deck block for recording and playing back signals into and from a video tape, and a tuner block for tuning a television signal. It should be noted that both the video-deck tuner blocks are not shown in the figure. When requesting the video-deck block to play back a signal from a video tape also not shown in the figure, for example, a control signal (a command signal in this case) with a format shown in FIG. 2B is transmitted. In this case, the control signal comprises the device address 'VTR1' of the VTR 1 to execute the command, 'command' for indicating that the control signal is a command signal and actual code 'video deck' and 'play' of the command in its device-address, command/status and data fields, respectively.

Figure 2C:
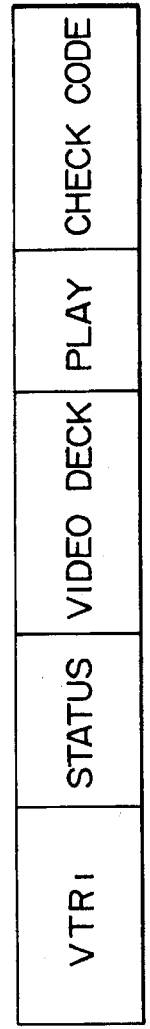

In contrast, in order for the VTR 11 to inform that the video-deck block of its VTR blocks is playing back a signal from a video tape, a control signal (a status signal in this case) with a format shown in FIG. 2C is transmitted. In this case, the control signal comprises the device address 'VTR1' of the VTR 1 outputting the status, 'status' for indicating that the control signal is a status signal and actual code 'video deck' and 'play' of the status in its device-address, command/status and data fields, respectively.

Figure 2D:
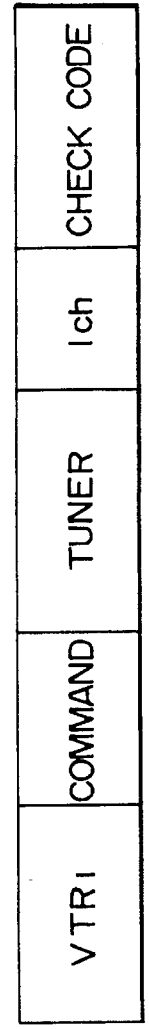

In order to set the channel of the tuner block in the VTR blocks of the VTR 11 to Channel 1, for example, a control signal with a format shown in FIG. 2D is transmitted.

When the control signal is a command signal as shown in FIG. 2B or 2D, the device address of AV equipment to execute the command is described in the device-address field of the control signal. In this case, the microcomputer 2, 12 or 22 employed in the AV equipment verifies the device address described in the command signal. If the device address described in the command signal is found to match the device address of its own equipment, processing requested by the command is carried out.

In contrast when the control signal is a status signal as shown in FIG. 2C, the device address of AV equipment informing its own status is described in the device-address field of the control signal. In this case, the microcomputer 2, 12 or 22 employed in the AV equipment sets the current status of its own equipment identified by the device address in the status signal.

By exchanging the control signals described above in the AV system shown in FIG. 1, merely pressing a PLAY button of the MDP 21 which is not shown in the figure, for example, will cause the interlocked TV 1 and VTR 11 to operate. As a result, video and audio signals played back by the MDP blocks of the MDP 21 can be monitored by the TV blocks of the TV 1 while the video and audio signals are being recorded by the VTR blocks of the VTR 11 into a video tape.

To describe the above operations in more detail, pressing the PLAY button on the MDP 21 starts an operation to play back the video and audio signals. Then, the microcomputer 22 employed in the MDP 21 sends a control signal through the multiline cable Cb to turn on the power of the TV 1 and allows the MDP blocks of the MDP 21 to transmit the reproduced video and audio signals to the display unit and the speakers of the TV blocks, respectively, through the multiline cable Cb. At the same time, the control signal also requests the TV 1 to forward the video and audio signals to the VTR blocks of the VTR 11 through the multiline cable Ca.

The control signal is received by the microcomputer 2 employed in the TV 1. Receiving the control signal, the microcomputer 2 turns on the power of the TV blocks of the TV 1, allowing the video and audio signals reproduced by the MDP blocks of the MDP 21 to be received by the TV blocks of the TV 1 through the multiline cable Cb. At the same time, the ACV 3 is requested to switch the selector 4 so that the video and audio signals are also forwarded to the VTR blocks of the VTR 11 through the multiline cable Ca.

In the mean time, the microcomputer 22 employed in the MDP 21 outputs a control signal through the multiline cable Cb to turn on the power of the VTR blocks of the VTR 11, enabling the VTR blocks to record the video and audio signals received through the multiline cable Ca.

This control signal is received by the microcomputer 12 employed in the VTR 11 through the control bus 9 employed in the TV 1 and the multiline cable Ca. Receiving the control signal, the microcomputer 12 turns on the power of the VTR blocks of the VTR 11, requesting the VTR blocks to record the video and audio signals received through the multiline cable Ca.

In the interlocked operations described above, by merely pressing the PLAY button of the MDP 21, video and audio signals played back by the MDP blocks of the MDP 21 can be monitored by the TV blocks of the TV 1 while the video and audio signals are being recorded by the VTR blocks of the VTR 11 into a video tape.

It should be noted that the control signals are each transmitted and received as an active-high digital signal. In addition, data of a control signal is variable in length. Typically, the data length is a multiple of eight bits.

Next, verification of connection upon completion of the configuration of an AV system, an essential point of the present invention, is described. At a preparation stage prior to the description, the detectors 7a to 7c for detecting control signals are explained first. As described before, the detectors 7a to 7c are provided for the plugs Pa to Pc of the TV 1, respectively.

At the detectors 7a to 7c, the signal-line level of a routed control signal is monitored. A high signal-line level is regarded as an incoming control signal from one of the plugs Pa to Pc. In this case, typically, a high-level detection signal is output to the microcomputer 2 to indicate the existence of an incoming control signal.

It should be noted that noise may be introduced to the signal line of a routed control signal, raising the signal line to a high level instantaneously as shown in FIG. 3A. In order to discriminate such an instantaneous high level of a signal line, the high-level detection signal is output by the detector 7a, 7b or 7c, lagging behind the rising edge of the instantaneous high level of the signal line by a predetermined fixed amount of time as shown in FIG. 3B.

Figure 4:
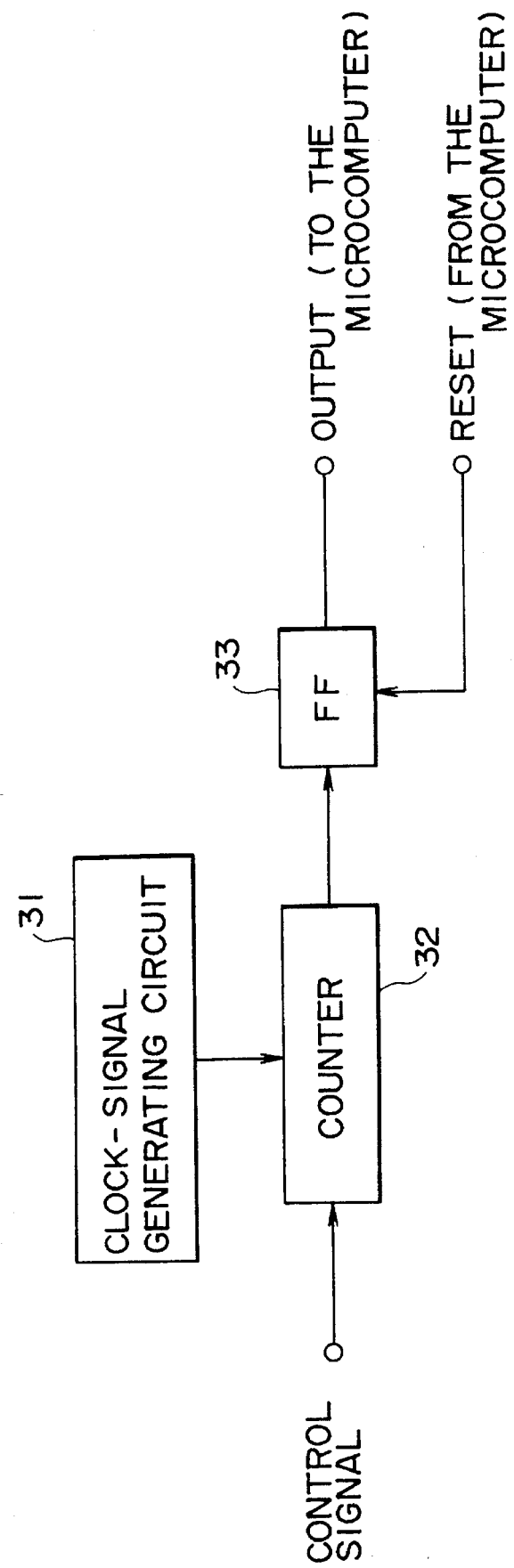
FIG. 4 is a diagram showing a more detailed configuration of the detectors 7a to 7c employed in the embodiment shown in FIG. 1.

Described in concrete terms, the detectors 7a to 7c each comprise a clock-signal generating circuit 31, a counter 32 and a flip-flop 33 as shown in FIG. 4. The clock-signal generating circuit 31 is used for generating a clock signal with a clock period shorter than the period of a control signal. The counter 32 counts the number of clocks generated by the clock-signal generating circuit 31 only while the control signal is being held at a high level. As the counter 32 counts a predetermined number of clocks, typically 16 clocks, incrementing the contents thereof from 0 to 15, the counter 32 raises its output to a high level. The high-level output of the counter 32 is latched by the flip-flop 33.

The detectors 7a to 7c having a configuration described above are each used for detecting an incoming control signal as shown in FIGS. 5A to 5E. To describe it in detail, when a control signal having a high level as shown in FIG. 5A is supplied to the counter 32, the counting of clocks of FIG. 5B generated by the clock-signal generating circuit 31 is started from an initial value of zero as shown in FIG. 5C.

If the level of the control signal turns low before the clockcount reaches 15 as indicated by the first pulse shown in FIG. 5A, that is, if the signal line of the control signal is raised to a high level for a short period of time, typically by noise, the counter 32 resets the contents thereof by itself to zero as shown in FIG. 5C.

If the level of the control signal is still at a high level even after the clockcount has reached 15 as indicated by the second pulse shown in FIG. 5B, that is, if the signal line of the control signal has been at a high level continuously for a period of time corresponding to a period of 16 clocks generated by the clock-signal generating circuit 31, on the other hand, the output of the counter 32 is raised to a high level to indicate a carry-over of its contents for a period of time equal to one period of a clock generated by the clock-signal generating circuit 31 as shown in FIG. 5D. The high-level output of the counter 32 is latched by the flip-flop 33, raising the output of the flip-flop 33 to a high level as shown in FIG. 5E. The high-level output of the flip-flop 33 is, in turn, transmitted as a detection signal to the microcomputer 2.

It should be noted that, if necessary, the flip-flop 33 is reset by a reset signal output by the microcomputer 2 as shown in FIG. 4.

In this way, noise can be prevented from causing the detector 7a to raise the detection signal to a high level.

It should be noted that the period of the clock signal generated by the clock-signal generating circuit 31 is determined by considering, among other factors, the duration of the high-level control-signal line caused by noise as well as the duration of the high-level control-signal line caused by a true control signal.

A technique for verifying the connection is explained by referring back to FIG. 1. As described before, the plugs Pa to Pc of the TV 1, the plug $P_{VTR}$ 0f the VTR 11 and the plug $P_{MDP}$ of the MDP 21 all have the same configuration. Accordingly, the plug $P_{VTR}$ of the VTR 11 can be connected to one of the plugs Pa to Pc of the TV 1 by using either of the multiline cables Ca and Cb which also have the same configuration. Likewise, the plug $P_{MDP}$ of the MDP 21 can also be connected to one of the plugs Pa to Pc of the TV 1 by using either of the multiline cables Ca and Cb as well.

In other words, any piece of the AV equipment can be connected to one of the plugs Pa to Pc of the TV 1. Accordingly, the user can just connect any AV equipment to an available plug among Pa to Pc of the TV 1 by using the multiline cable Ca or Cb. On top of that, the plugs Pa to Pc allow control, video and audio signals to be exchanged among pieces of AV equipment through multiline cables. As a result, it is no longer necessary to establish connection on a pin-to-pin basis, which is prone to errors, as is the case with the conventional method.

In the case of the embodiment, the plug $P_{VTR}$ of the VTR 11 is connected to the plug Pa of the TV 1 using the multiline cable Ca whereas the plug $P_{MDP}$ of the MDP 21 is connected to the plug Pb of the TV 1 using the multiline cable Cb as shown in FIG. 1.

Figure 6B:
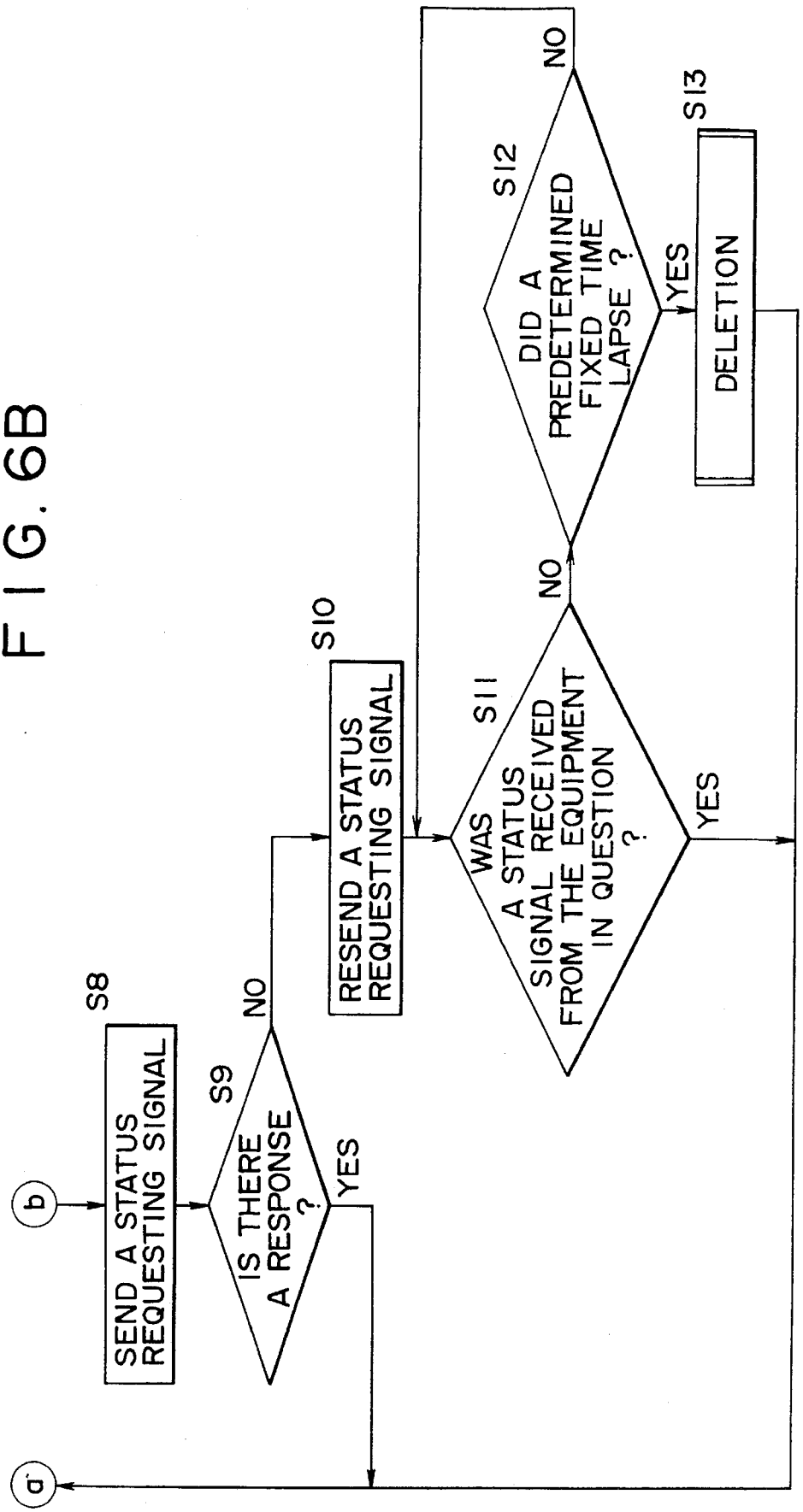

As the power of the TV 1 is turned on after completing the connection, the microcomputer 2 employed in the TV 1 carries out initialization at a step S1 of a flowchart shown in FIG. 6. It should be noted that, in order to turn on the power, it is necessary to insert the power plug of the TV 1 into a power socket and to put a power switch 30 of the TV 1 at the ON position. Details of the initialization carried out at the step S1 are described as a flowchart shown in FIG. 8.

Figure 7:
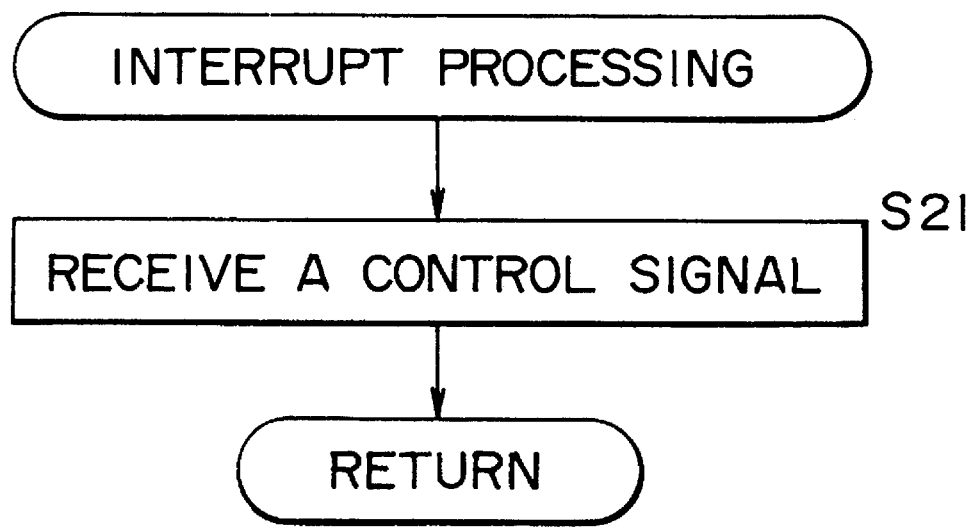
FIG. 7 is a flowchart used for explaining interrupt processing carried out by the microcomputer 2 and microcomputers 12 and 22 employed in the embodiment shown in FIG. 1.

Here, a control signal transmitted to the microcomputer 2 of the TV 1, the microcomputer 12 of the VTR 11 or the microcomputer 12 of the MDP 21 is received at a step S21 of interrupt processing shown in FIG. 7.

First of all, at a step S31 of the flowchart shown in FIG. 8, the device-address table is referred to. The device-address table is used for storing device addresses of pieces of AV equipment that may be connected. Device addresses are read out from the device-address table in the same order the device addresses were stored in the device-address table.

Here, in the ROM unit 2a embedded in the microcomputer 2 employed in the TV 1, the device-address table, typically like one shown in FIG. 9, is written in advance. As described above, the device-address table is used for storing device addresses of pieces of AV equipment that may be connected.

Figure 2E:
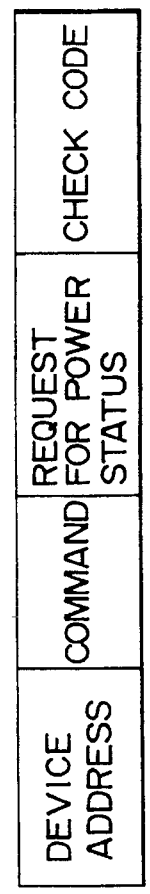

Each time a device address is read out from the device-address table shown in FIG. 9 at the step S31, the flow continues to a step S32 to find out whether the read data is a code indicating the end of the device-address table which is typically an EOF. If the data read from the device-address table is found at the step S32 to be not an EOF, that is, if the data read from the address table is found at the step S32 to be a real device address, the flow continues to a step S33 where a control signal is transmitted. The control signal is a command signal with a format shown in FIG. 2E. As shown in FIG. 2E, the device address is prescribed at the head of the command signal. The command signal inquires after the power status of the AV equipment specified by the device address. The power status indicates whether the power supply of the AV equipment is turned on or off. Such a command signal is referred to hereafter as a status requesting signal. The status requesting signal is output to all the plugs Pa to Pc of the TV 1. Then, the flow returns to the step S31. It should be noted, however, that status requesting signals are not limited to the status requesting signal described above for inquiring after a power status. A status requesting signal may inquire after any operational state such as a PLAY status of the AV equipment.

If the data read from the device-address table shown in FIG. 9 is found at the step S32 to be an EOF, that is, if status requesting signals each inquiring after a power status have been sent to all the pieces of AV equipment through the plugs Pa to Pc of the TV 1, on the other hand, the flow continues to a step S34. As described above, each of the status requesting signals includes, at the head thereof, a device address of a piece of the AV equipment listed in the device-address table. At the step S34, the microcomputer 2 finds out whether a control signal has been received at the step S21 of the interrupt processing shown in FIG. 7 from the AV equipment. In the case of the embodiment shown in FIG. 1, the control signal is received from either the microcomputer 12 employed in the VTR 11 or the microcomputer 22 employed in the MDP 21.

If a control signal is found at the step S34 to have been received at the step S21, the flow continues to a step S35 to find out whether or not the control signal is a status signal conveying the inquired after power status. If the control signal is found at the step S35 to be a status signal conveying the inquired after power status, the flow continues to a step S36 at which a device address described at the head of the status signal as shown in FIGS. 2A to 2E is stored in a temporary storage area allocated in a predetermined address space of the RAM unit 2b embedded in the microcomputer 2. The device address is the device address of a piece of the AV equipment that transmitted the status signal. There are at least as many such allocated storage areas as plugs of the TV 1, the plugs Pa to Pc in this case. The flow then continues to a step S37.

If the control signal is found at the step S35 to be not a status signal conveying the inquired after power status, on the other hand, the flow continues to the step S37, skipping the step S36.

If a control signal is found at the step S34 not to have been received at the step S21, on the other hand, the flow continues to the step S37, skipping the steps S35 and S36. At the step S37, the microcomputer 2 determines whether a predetermined fixed time has lapsed since the issuance of the status requesting signal at the step S33.

Here, the predetermined fixed time is a sufficient time for the microcomputer 2 to receive a status signal sent from the AV equipment in response to the status requesting signal.

If the predetermined fixed time is found at the step S37 not to have lapsed since the issuance of the status requesting signal at the step S33, that is, if the sufficient time required for transmitting the status signal in response to the status requesting signal has not lapsed since the issuance of the status requesting signal at the step S33, the flow returns to the step S34 to repeat the operations beginning with the step S34.

If the predetermined fixed time is found at the step S37 to have lapsed since the issuance of the status requesting signal at the step S33, on the other hand, the flow continues to a step S38 to find out whether a device address has been stored in the temporary storage area allocated in the RAM unit 2b embedded in the microcomputer 2.

In the case of the AV system shown in FIG. 1, by the time the microcomputer 2 carries out the processing at the step S38, the device addresses 'VTR1' and/or 'MDP1' of the VTR 11 and/or the MDP 21, respectively, may have been recorded in the temporary storage areas of the RAM unit 2b embedded in the microcomputer 2 as shown in FIG. 10.

If a device address is found at the step S38 to have been stored in the temporary storage areas of the RAM unit 2b embedded in the microcomputer 2, the flow continues to a step S39 to read out one of the device addresses from the temporary storage areas before proceeding to a step S40.

At the step S40, the microcomputer 2 outputs a reset signal to all the detectors 7a to 7c shown in FIG. 1. The reset signal resets all the detectors 7a to 7c or, strictly speaking, all the flip-flops 33 employed therein as shown in FIG. 4. This is because the detectors 7a to 7c may have raised their outputs to a high level because of status signals received in response to a status requesting signals each inquiring after a power status output by the microcomputer 2 during the processings carried out at the steps S31 to S37. The high-level outputs of the flip-flops 33 are reset by the reset signal output at the step S40.

The flow then continues to a step S41 where a status requesting signal for inquiring after a power status is output to all the plugs Pa to Pc of the TV 1. At the head of the status requesting signal, the device address read out at the step S39 is prescribed. Subsequently, the flow proceeds to a step S42. At the step S42, the microcomputer 2 finds out whether a control signal has been received at the step S21 of the interrupt processing shown in FIG. 7 from the AV equipment, that is, in the case of the AV system shown in FIG. 1, from the microcomputer 12 employed in the VTR 11 or the microcomputer 22 employed in the MDP 21.

If a control signal is found at the step S42 not to have been received at the step S21, or found to have been received at the step S21 but the received control signal is not a status signal conveying the power status transmitted in response to the status requesting signal transmitted at the step S41, the flow continues to a step S46 to find out whether a predetermined fixed time has lapsed since the issuance of the status requesting signal at the step S41.

If the predetermined fixed time is found at the step S46 not to have lapsed since the issuance of the status requesting signal at the step S41, that is, if the sufficient time required for transmitting a status signal in response to the status requesting signal has not lapsed since the issuance of the status requesting signal at the step S41, the flow returns to the step S42 to repeat the operations beginning with the step S42.

If the predetermined fixed time is found at the step S46 to have lapsed since the issuance of the status requesting signal at the step S41, on the other hand, the flow continues to a step S47 to delete the device address read out at the step S39 from the temporary storage area. The flow then returns to the step S38.

In other words, the fact that a response to the status requesting signal has not been received even if the predetermined fixed time has lapsed indicates that either the device address read out from the temporary storage unit at the step S39 was recorded incorrectly for some reason in the temporary storage unit or the AV equipment owning the device address is not in a state of being electrically connected properly. In this case, the device address is deleted from the temporary storage unit without being cataloged in a selector control table shown in FIG. 11 to be described later.

If a control signal is found at the step S42 to have been received at the step S21 and the control signal is a status signal conveying the power status transmitted in response to the status requesting signal transmitted at the step S41, on the other hand, the flow continues to a step S43 to examine detection signals output by the detectors 7a to 7c. The flow then continues to a step S44.

At the step S44, whether only one of the detectors 7a to 7c is outputting a high-level detection signal is examined. If more than one detection signal are found at the step S44 to have been set at a high level, that is, if at least two of the detectors 7a to 7c are found at the step S44 to be holding their detection signals at a high level, it is impossible to determine whether the control signal found at the step S42 to have been received at the step S21 is input from the plug Pa, Pb or Pc of the TV 1. Therefore, the flow returns to the step S40 to repeat the processings beginning with the step S40 at which the detectors 7a to 7c are reset.

If only one detection signal is found at the step S44 to have been set at a high level, on the other hand, the flow continues to a step S45 to identify which of the detectors 7a to 7c is raising its detection signal to a high level or identify which of the plugs Pa to Pc has passed on the control signal found at the step S42 to have been received at the step S21. It should be noted that the detectors 7a to 7c are associated with the plugs Pa to Pc, respectively, as described earlier. A device address prescribed at the head of the control signal, or strictly speaking, the status signal found at the step S42 to have been received at the step S21, is then recognized. A pair comprising the identified plug Pa, Pb or Pc and the device address is finally recorded in a storage area allocated in advance in the RAM unit 2b embedded in the microcomputer 2 to form the selector control table of FIG. 11 cited earlier.

Later on, the flow returns to the step S38 to repeat the processings through a step S47 at which the device address recorded into the selector control table at the step S45 is deleted from the temporary storage areas allocated in the RAM unit 2b embedded in the microcomputer 2 as described earlier.

In the course of repeating the processings, all device addresses are deleted from the temporary storage areas allocated in the RAM unit 2b of the microcomputer 2 by the operation carried out at the step S47. After all device addresses have been deleted, no device address is found at the step S38 left in the temporary storage area in which case the processing flow is terminated.

The initialization carried out by the AV system shown in FIG. 1 as described above results in the selector control table shown in Table 11. As shown in FIG. 11, two pairs of plug and device addresses are cataloged in the selector control table. One of the pairs comprises the plug Pa and the device address 'VTR1' assigned to the VTR 11 connected to the plug Pa, whereas the other pair comprises the plug Pb and the device address 'MDP1' assigned to the MDP 21 connected to the plug Pb.

It should be noted that, a code 'Not connected' is recorded in the selector control table shown in FIG. 11 for the plug Pc, a plug to which a device address of AV equipment was not assigned during the initialization. The code 'Not connected' means that a plug to which the code is assigned is not connected to any AV equipment.

Referring back to FIG. 6, after the initialization carried out at the step S1, the microcomputer 2 employed in the TV 1 can recognize the connection status of the plugs Pa to Pc by referring to the selector control table shown in FIG. 11. To be more specific, the microcomputer 2 can recognize the device address of AV equipment connected to a plug or recognize the fact that a plug is not connected to any AV equipment. After the initialization carried out at the step S1, the TV 1, the VTR 11 and MDP 21 can thus operate in an interlocked manner by exchanging control signals as described above.

In other words, the microcomputer 2 employed in the TV 1 can recognize the fact that the VTR 11 and the MDP 21 are connected to the plugs Pa and Pb, respectively, by referring to the selector control table shown in FIG. 11. For example, video and audio signals played back at the MDP blocks of the MDP 21 can thus be recorded into a video tape by the VTR blocks of the VTR 11 while being monitored by the TV blocks of the TV 1 as described above. In this case, control signals are exchanged as described above so that the microcomputer 2 can forward the video and audio signals input from the plug Pb to the TV blocks of the TV 1. At the same time, the video and audio signals are also passed on to the plug Pa through proper switching of the selector 4 which is executed by controlling the AVC 3.

As described above, the TV 1 can be connected to the VTR 11 and the MDP 21 by the multiline cables Ca and Cb, respectively. As a result, the AV system can be built with ease without worrying about how to connect these pieces of AV equipment to each other. Further, the connection status of the pieces of AV equipment, the TV 1, the VTR 11 and the MDP 21 in the case of this embodiment, can be verified correctly by merely exchanging control signals without the necessity to receive and transmit any video and audio signals.

In addition, the connection status of the TV 1, the VTR 11 and the MDP 21 is verified automatically at the time the power of the TV 1 is turned on without the necessity to carry out any special operation. Further, the user is not aware of the verification of the connection status. As a result, the user is prevented from feeling irritated.

In addition, control signals exchanged among the microcomputers 2, 12 and 22 are used, allowing the connection status to be verified rapidly. Further, these control signals are not special signals for connection-verification purposes.

Instead, these control signals are the same signals for ordinary control to be carried out from the beginning. As a result, the control of the AV equipment can be prevented from becoming complex.

Incidentally, after an AV system has been built by connecting pieces of AV equipment to each other, a new piece of AV equipment may be added in order to upgrade the AV system or an existing piece of AV equipment may be removed or disconnected due to, among other reasons, obsolescence. When the state of the connection among pieces of AV equipment is changed due to addition or disconnection of a new or obsolete piece of AV equipment, it is necessary to update the selector control table stored in the RAM unit 2b embedded in the microcomputer 2 employed in the TV 1 in order for the AV equipment to work normally.

By monitoring control signals exchanged among the pieces of AV equipment, which once functioned in an interlocked manner by virtue of the initialization carried out at the step S1 of the flowchart shown in FIG. 6 immediately after power on, the TV 1 can detect a change in connection status, updating the selector control table.

To be more specific, at a step S2 of the flowchart shown in FIG. 6, the microcomputer 2 employed in the TV 1 finds out whether a control signal from a piece of AV equipment, that is, from the VTR 11, the MDP 21 or a newly added piece of AV equipment, has been received at the step S21 of the interrupt processing shown in FIG. 7.

If no control signal is found at the step S2 of the flowchart shown in FIG. 6 to have been received at the step S21 of the interrupt processing shown in FIG. 7, the step S2 is repeated. If a control signal is found at the step S2 of the flowchart shown in FIG. 6 to have been received at the step S21 of the interrupt processing shown in FIG. 7, on the other hand, the flow continues to a step S3 to determine whether the received control signal is a status signal.

If the received control signal is found at the step S3 to be a status signal, the flow continues to a step S4 to find out whether a device address prescribed at the head of the status signal is cataloged in the selector control table. If the device address prescribed at the head of the status signal is found at the step S4 to have been cataloged in the selector control table, that is, if the device address of AV equipment transmitting the status signal has been recorded in the selector control table by the initialization carried out at the step S1 as described above or addition processing at a step S5 to be described later, the flow returns to the step S2, repeating the processing beginning with the step S2.

If the device address prescribed at the head of the status signal is found at the step S4 not to have been cataloged in the selector control table, that is, if the AV equipment transmitting the status signal is a newly added piece of AV equipment, the flow proceeds to a step S5, at which the addition processing is carried out to catalog the device address of the new AV equipment in the selector control table as an additional item.

Figure 12:
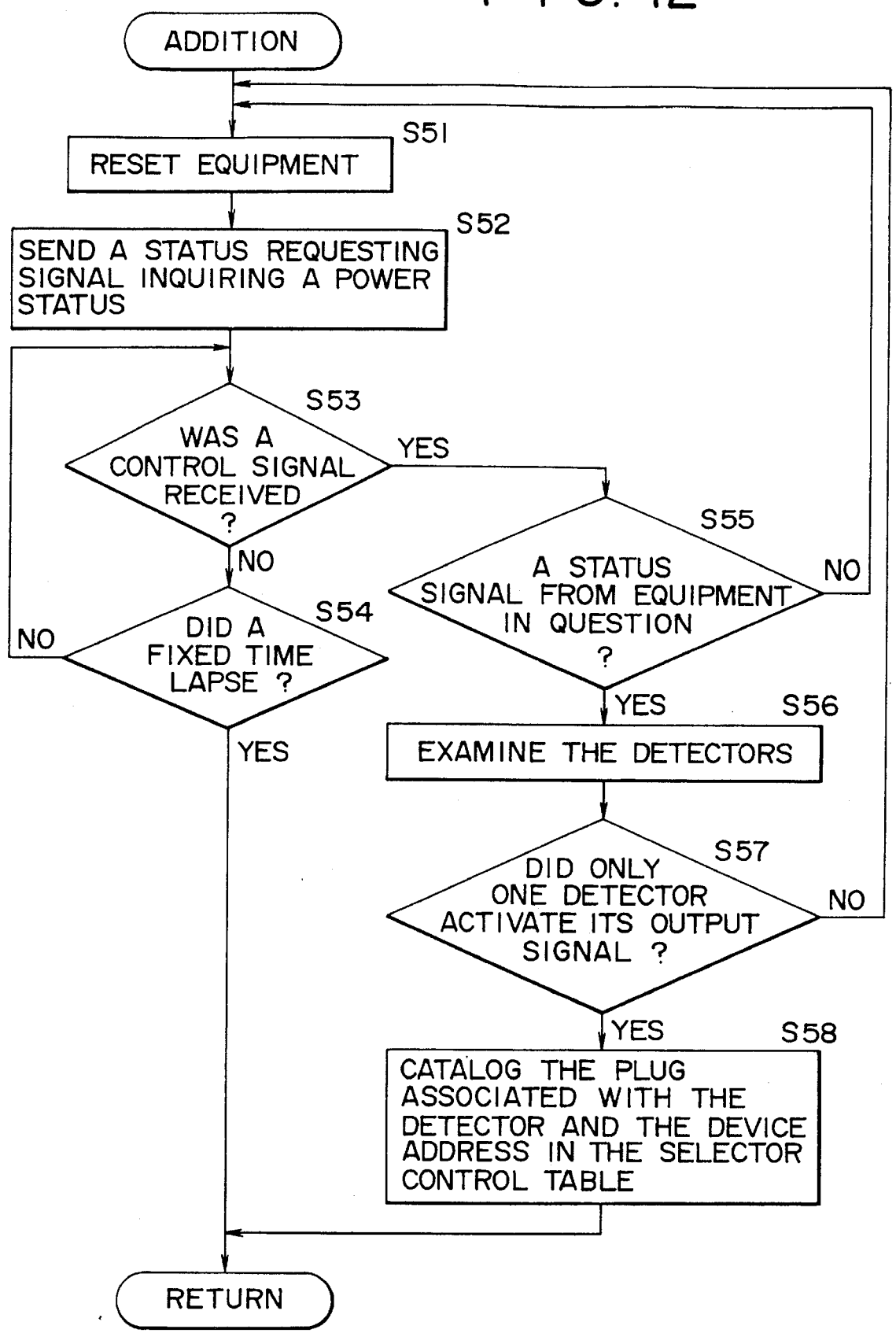
FIG. 12 is a more detailed flowchart of addition processing carried out at a step S5 of the flowchart shown in FIG. 6.

Details of the addition processing carried out at the step S5 are shown in FIG. 12. First of all, at a step S51 of a flowchart shown in FIG. 12, the microcomputer 2 resets the selectors 7a to 7c shown in FIG. 1. The flow then continues to a step S52.

At the step S52, a status requesting signal is output to all the plugs Pa to Pc. At the head of the status requesting signal, the device address prescribed at the head of the control signal found to be a status signal at the step S3 of the flowchart shown in FIG. 6 is prescribed. This device address is the device address of a newly connected piece of the AV equipment which is referred to hereafter merely as new AV equipment. The flow then proceeds to a step S53 to find out whether a control signal has been received at the step S21 of the interrupt processing shown in FIG. 7.

If no control signal is found at the step S53 of the flowchart shown in FIG. 12 not to have been received at the step S21 of the interrupt processing shown in FIG. 7, the flow continues to a step S54 to find out whether a predetermined fixed time has lapsed since the issuance of the status requesting signal at the step S52.

If a predetermined fixed time is found at the step S54 not to have lapsed since the issuance of the status requesting signal at the step S52, that is, if a sufficient time required for transmitting a status signal in response to the status requesting signal issued at the step S52 has not lapsed since the issuance of the status requesting signal, the flow returns to the step S53 to repeat the operations beginning with the step S53.

If a predetermined fixed time is found at the step S54 to have lapsed since the issuance of the status requesting signal at the step S52, on the other hand, the addition processing is terminated and the flow returns to the step S2 of the flowchart shown in FIGS. 2A to 2E. This is because the fact that the predetermined fixed time has lapsed means that the device address, which has been found at the step S4 not to have been cataloged in the selector control table, must have been received incorrectly due to a cause such as a transmission error. Thus, the new AV equipment specified by the device address is not really connected.

If a control signal is found at the step S53 of the flowchart shown in FIG. 12 to have been received at the step S21 of the interrupt processing shown in FIG. 7, the flow continues to a step S55 to find out whether the control signal is a status signal received from the new AV equipment in question as a response to the status requesting signal issued at the step S53 and whether the status signal conveys the power status of the new equipment inquired after by the status requesting signal. As described earlier, the status requesting signal has a device address prescribed at its head for specifying the new AV equipment.

The control signal which is found at the step S53 of the flowchart shown in FIG. 12 to have been received at the step S21 of the interrupt processing shown in FIG. 7 may have been transmitted by the new equipment or the VTR 11 or the MDP 21 due to an interlocked state of the TV 1, the VTR 11 and the MDP 21 resulting from the completion of the initialization carried out at the step S1 of the flowchart shown in FIG. 1. For this reasons, the processing of the step S55 is performed in order to find out whether the control signal received at the step S21 of the interrupt processing shown in FIG. 7 has been indeed transmitted from the new AV equipment.

If the control signal received at the step S21 of the interrupt processing shown in FIG. 7 is found at the step S55 to have been transmitted not from the new AV equipment, that is, if the control signal is found transmitted from either the VTR 11 or the MDP 21, the flow returns to the step S51 to repeat the processings beginning with the step S51.

If the control signal received at the step S21 of the interrupt processing shown in FIG. 7 is found at the step S55 to have been transmitted by the new AV equipment, on the other hand, the flow continues to a step S56 to examine the detection signals output by the detectors 7a to 7c. The flow then proceeds to a step S57.

The flow continues to the step S57 to find out whether only one of the detection signals output by the detectors 7a to 7c is raised to a high level. If more than one detection signal output by the detectors 7a to 7c are found at the step S57 to have been raised to a high level, that is, if at least two of the detectors 7a to 7c are found at the step S57 to be holding their detection signals at a high level, it is impossible to find out whether the control signal received at the step S53 is input from the plug Pa, Pb or Pc of the TV 1. Therefore, the flow returns to the step S51 to repeat the processings beginning with the step S51 at which the detectors 7a to 7c are reset.

If only one detection signal is found at the step S57 to have been set at a high level, on the other hand, the flow continues to a step S58 to identify which of the detectors 7a to 7c is raising its detection signal to a high level or identify which of the plugs Pa to Pc has passed on the control signal found at the step S53 to have been received at the step S21. It should be noted that the detectors 7a to 7c are associated with the plugs Pa to Pc, respectively, as described earlier. A device address described at the head of the control signal, or strictly speaking, the status signal found at the step S53 to have been received at the step S21, is then recognized. A new pair comprising the identified plug Pa, Pb or Pc and the device address is finally recorded in the selector control table of FIG. 11 in the storage area allocated in advance in the RAM unit 2b embedded in the microcomputer 2. The operation to add the new pair of device address and plug to the selector control table carried out at the step S58 terminates the addition processing.

As described above, a status signal with a device address at the head thereof not cataloged in the selector control table may be received. In this case, the device address is considered to be a device address of a new piece of AV equipment. As such a status signal is received, the new AV equipment is added to the AV system by the addition processing, allowing the entire system to operate in an interlocked manner without the necessity for the user to carry out, among other pieces of work, operations to catalog or remove AV equipment by himself.

Referring back to FIG. 6, if the control signal found at the step S2 to have been received at the step S21 is found at the step S3 to be not a status signal, that is, if the received control signal is found at the step S3 to be a command signal, on the other hand, the flow continues to a step S6. At the step S6, the microcomputer 2 monitors the operation of the AV equipment specified by a device address prescribed at the head of the command signal for a fixed time in order to find out whether the AV equipment operates in accordance with a command signal.

The flow then continues to a step S7 to find out whether the AV equipment specified by the device address prescribed at the head of the command signal operates normally. If the AV equipment specified by the device address prescribed at the head of the command signal is found at the step S7 to have been operating normally, the flow returns to the step S2.

If the AV equipment specified by the device address prescribed at the head of the command signal is found at the step S7 not to have been operating normally, on the other hand, the flow proceeds to a step S8. At the step S8, a status requesting signal is sent to all the plugs Pa to Pc for inquiring after the power status of the AV equipment specified by the device address prescribed at the head of the command signal. The device address is this time prescribed at the head of the status requesting signal.

The flow then continues to a step S9 to find out whether a response to the status requesting signal transmitted at the step S8 is present. If a response to the status requesting signal transmitted at the step S8 is found at the step S9 to be present, the flow returns to the step S2 to repeat the processings beginning with the step S2. This is because the judgment to determine that the AV equipment has not been operating normally is considered to have been made at the step S7 because of the control signal not received correctly due to a transmission error or the like.

If a response to the status requesting signal transmitted at the step S8 is found at the step S9 to be absent, on the other hand, the flow proceeds to a step S10 to send another status requesting signal again for a reverification purpose. Much like the step S8, the other status requesting signal is retransmitted at the step S10. At the head of the other status requesting signal, the device address of the AV equipment found not operating normally at the step S7 is prescribed.

After the retransmission of the other status requesting signal, the flow proceeds to a step S11 to find out whether a response to the other status requesting signal sent at the step S10 is present, that is, whether a status signal is received from the AV equipment found not operating normally at the step S7. If a status signal is found at the step S11 to have been received, the flow returns to the step S2 to repeat the processings beginning with the step S2. This is because the judgment to determine that the AV equipment has not been operating normally is considered to have been made at the step S7 because of the control signal not received correctly due to a transmission error or the like as evidenced by the fact that a response to the status requesting signal sent at the step S8 was found absent at the step S9.

If a status signal is found at the step S11 not to have been received, on the other hand, the flow continues to a step S12 to find out whether a predetermined fixed time has lapsed since the issuance of the other status requesting signal at the step S10.

If the predetermined fixed time is found at the step S12 to have not lapsed, that is, if a sufficient time required to receive a status signal in response to the other status requesting signal has not lapsed since the issuance of the other status requesting signal at the step S10, the flow returns to the step S11.

If the predetermined fixed time is found at the step S12 to have lapsed since the issuance of the other status requesting signal at the step S10, on the other hand, the flow continues to a step S13 for carrying out deletion processing. To be more specific, the device address of the AV equipment that did not respond to the other status requesting signal sent at the step S10 is deleted from the selector control table shown in FIG. 11 at the step S13. Such a device address is referred to as a no-response device address.

Details of the deletion processing carried out at the step S13 are described as a flowchart shown in FIG. 13. First of all, at a step S61 of the flowchart shown in FIG. 13, the microcomputer 2 searches the selector control table shown in FIG. 11 for the no-response device address. The flow then continues to a step S62 at which the code 'Not connected' is written into the selector control table to replace the no-response device address. The flow finally returns to the step S2 of the flowchart shown in FIG. 6, ending the deletion processing.

As described above, a status requesting signal is sent to AV equipment which has a device address cataloged in the selector control table but does not operate normally. If a response to the status requesting signal is not received, the processing to delete the AV equipment is carried out. As a result, the entire system can operate in an interlocked manner even if AV equipment employed in the AV system is removed without the necessity for the user to carry out, among other pieces of work, operations to catalog and remove AV equipment by himself.

In order to perform the initialization, addition processing and deletion processing described above, the connection can be verified a plurality of times, typically twice. Cataloging or decataloging of data into or from the selector control table is carried out only if two verifications give the same results. In this way, incorrect cataloging and decataloging of data into and from the selector control table can thus be avoided.

In addition, the contents of the selector control table can be displayed in the output units 8 typically as a connection diagram or output as voice, allowing the user to recognize the connection state of the AV system.

Next, operations of the microcomputer 12 employed in the VTR 11 and the microcomputer 22 employed in the MDP 21 are described by referring to flowcharts shown in FIGS. 14 and 15, respectively. It should be noted, however, that operations carried out by the microcomputer 22 at steps S81 to S85 of the flowchart shown in FIG. 15 are the same as those executed by the microcomputer 12 at steps S71 to S75 of the flowchart shown in FIG. 14. Accordingly, description of the operations carried out by the microcomputer 22 at steps S81 to S85 of the flowchart shown in FIG. 15 is omitted, leaving only explanation of the operations carried out by the microcomputer 12 at steps S71 to S75 of the flowchart shown in FIG. 14.

First of all, at the step S71, the microcomputer 12 finds out whether a control signal has been received. If a control signal is found at the step S71 not to have been received, the step S71 is repeated. If a control signal is found at the step S71 to have been received, on the other hand, the flow continues to a step S72 to find out whether this control signal is a status requesting signal inquiring after the power status of the AV equipment employing the microcomputer 12, the VTR 11 in this case.

If the control signal found received at the step S71 is found at the step S72 to be, for example, not a status requesting signal inquiring after the power status, that is, if the control signal found received at the step S71 is found at the step S72 to be either a status requesting signal inquiring after a status other than the power status, for example, or a command signal, the flow returns to the step S71.

If the control signal found received at the step S71 is found at the step S72 to be a status requesting signal inquiring after the power status, on the other hand, the flow continues to a step S73 to find out whether the power of the VTR 11 is turned on or off. It should be noted that, in the case of the step S83 of FIG. 15, the power status of the MDP 21 is examined instead.

If the power of the VTR 11 is found at the step S73 to be turned off, the flow continues to a step S74 to output a status signal indicating that the power of the VTR 11 is turned off. In this case, the device address 'VTR1' of the VTR 11 is prescribed at the head of the status signal. It should be noted that in the case of the step S84 of FIG. 15, the device address of the 'MDP1' of the MDP 21 is prescribed instead at the head of the status signal. The flow then returns to the step S71.

If the power of the VTR 11 is found at the step S73 to be turned on, on the other hand, the flow continues to a step S75 to output a status signal indicating that the power of the VTR 11 is turned on. In this case, the device address 'VTR1' of the VTR 11 is prescribed at the head of the status signal. It should be noted that in the case of the step S85 of FIG. 15, the device address of the 'MDP1' of the MDP 21 is prescribed instead at the head of the status signal. The flow then returns to the step S71, to repeat the processings beginning with the step S71.

In order to allow control, video and audio signals to be exchanged among the pieces of AV equipment shown in FIG. 1 as if these signals were a single signal, the plugs Pa to Pc, $P_{VTR}$ and $P_{MDP}$ are each designed to comprise nine pins, i.e., a control-signal input pin, a control-signal output pin, a video-signal input pin, a video-signal output pin, an audio-signal input pin for a left channel, an audio-signal input pin for a right channel, an audio-signal output pin for the left channel, an audio-signal output pin for the right channel and a GND (ground) pin, and are connected to each other by the multiline cables Ca and Cb. However, it should be noted that, as an alternative, the plugs Pa to Pc, $P_{VTR}$ and $P_{MDP}$ can also be designed to allow the control, video and audio signals to be exchanged on a time-division or frequency-division basis as a multiplexed signal. In such a scheme, the multiplexed signal appears truly as a single signal exchanged among the pieces of AV equipment.

Figure 16A:
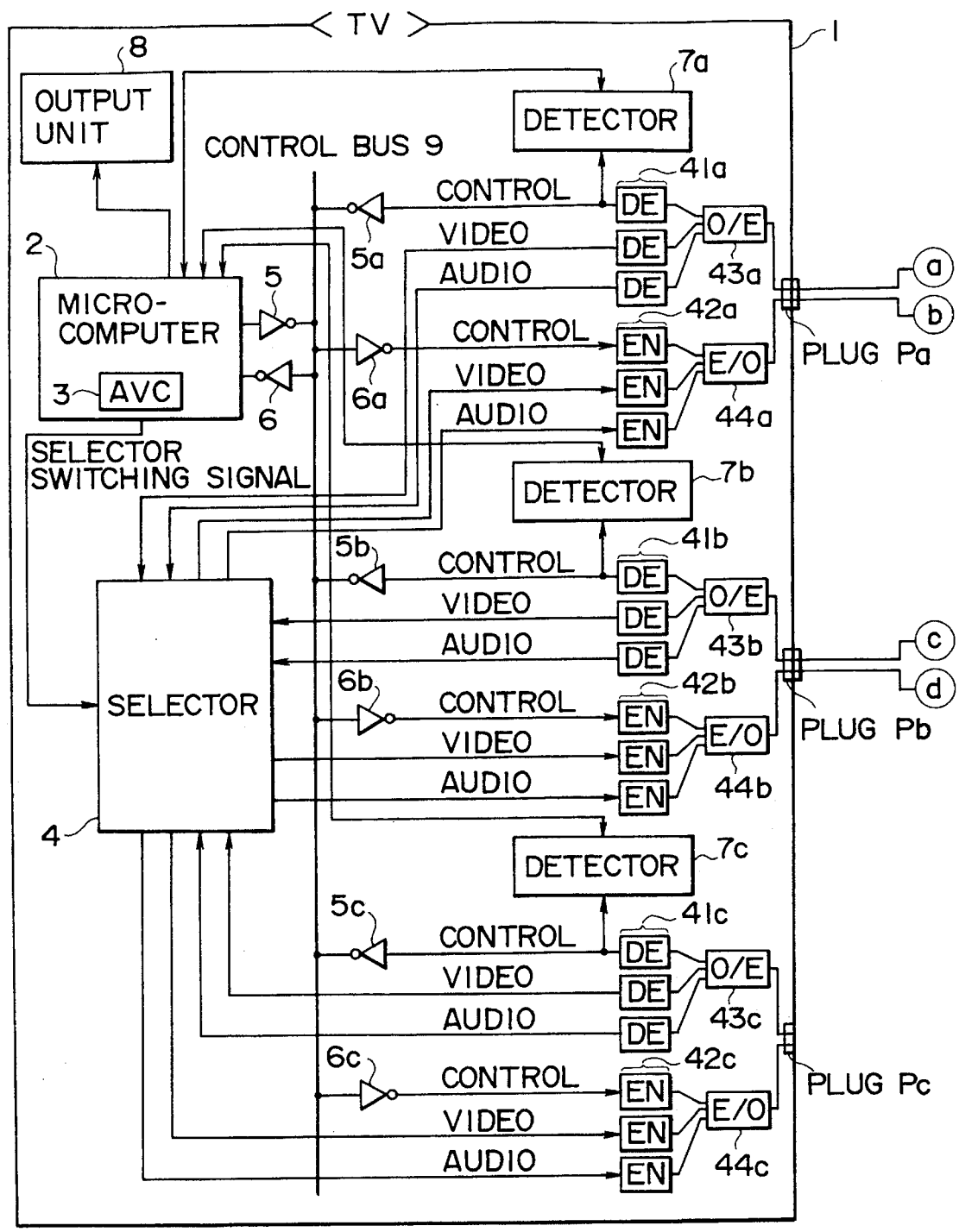
FIGS. 16A & 16B are block diagrams showing the configuration of another embodiment implementing a television receiver (TV) 1 employing an AV selector provided by the present invention.
Figure 16B:
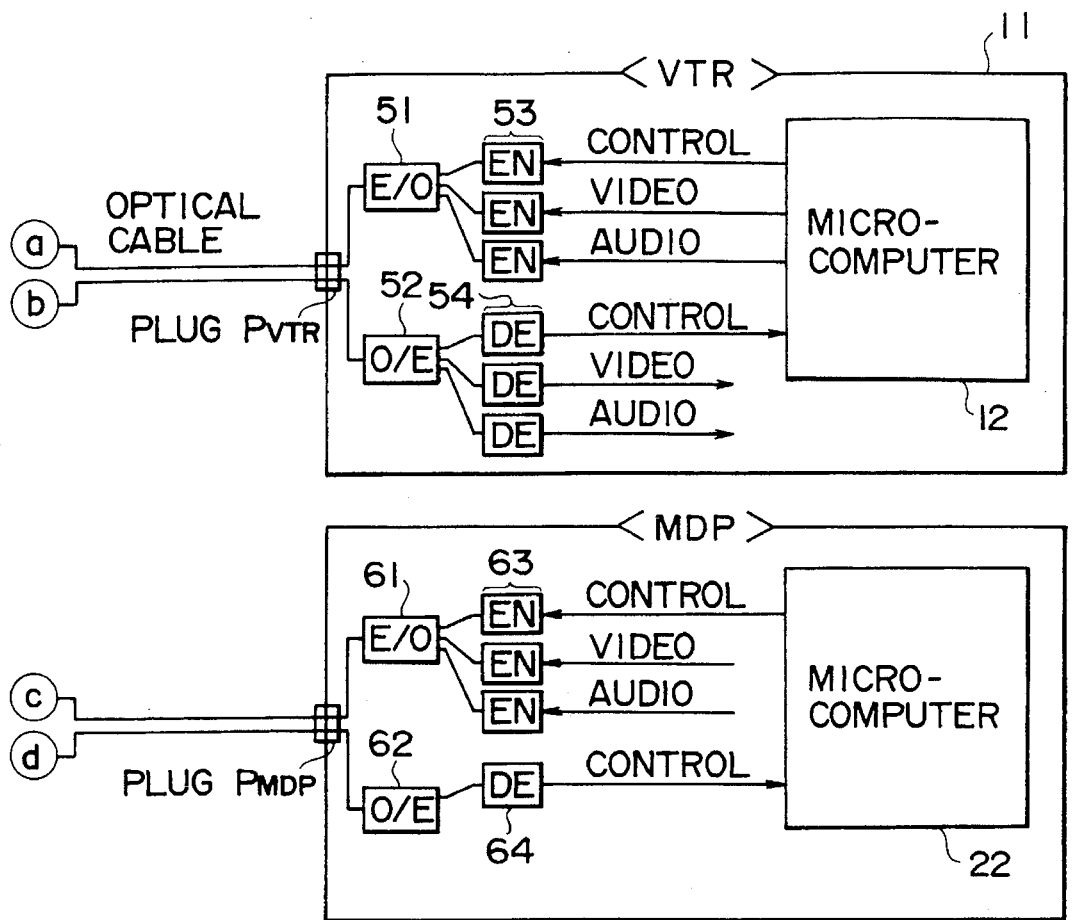

FIG. 16 shows the configuration of an embodiment implementing an AV system wherein the plugs Pa to Pc, $P_{VTR}$ and $P_{MDP}$ are each designed differently as described above, allowing frequency-multiplexed signals to be exchanged as single signals among pieces of AV equipment constituting the AV system, typically through optical cables. Components employed in the embodiment shown in FIG. 16 which are identical with those shown in FIG. 1 are denoted by the same reference numerals and/or notations.

As shown in FIG. 16, the TV 1 employed in the AV system has additional components including ENs (modulators) 41a to 41c, DEs (demodulators) 42a to 42C, O/Es (opto-electrical converters) 43a to 43c and E/Os (electro-optical converters) 44a to 44c. An E/O 51, an O/E 52, an EN 53 and a DE 54 are added to the VTR 11 whereas an E/O 61, an O/E 62, an EN 63 and a DE 64 are added to the MDP 21. In addition, the TV 1 is connected to the VTR 11 by an optical cable comprising two lines of optical fiber for transmission and reception of a signal (strictly speaking, light), respectively. Likewise, the TV1 is also connected to the MDP 21 using the same optical cable as that connected to the VTR 11. The remaining configuration is the same as the AV system shown in FIG. 1.

Figure 17:
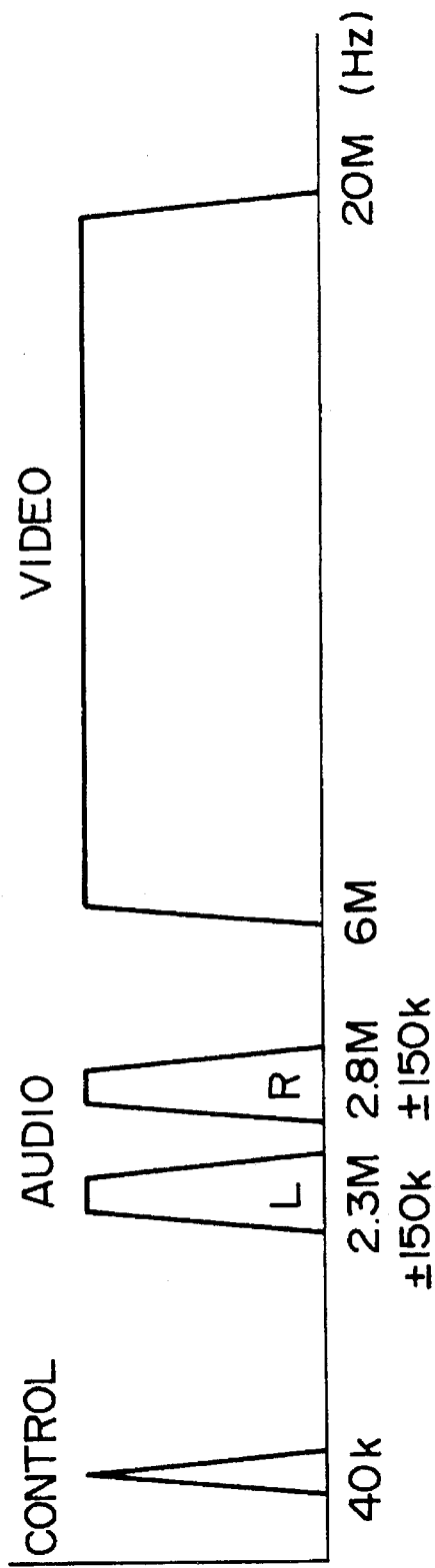
FIG. 17 is a diagram used for explaining a multiplexed signal exchanged in the embodiment shown in FIG. 16.

Typical allocation of frequencies to the control signal, the video signal and the audio signals for the left and right channels multiplexed in the AV system is shown in FIG. 17.

Multiplexed signals are typically exchanged in the AV system with a configuration described as follows. Let a multiplexed signal be transmitted from the TV 1 to the VTR 11, for example. In this case, first of all, a video signal output by a selector 4 shown in FIG. 16, audio signals from the left and right channels and a control signal output by the microcomputer 2 shown in FIG. 16 are supplied to the EN 42a as shown in FIG. 18.

Figure 18A:
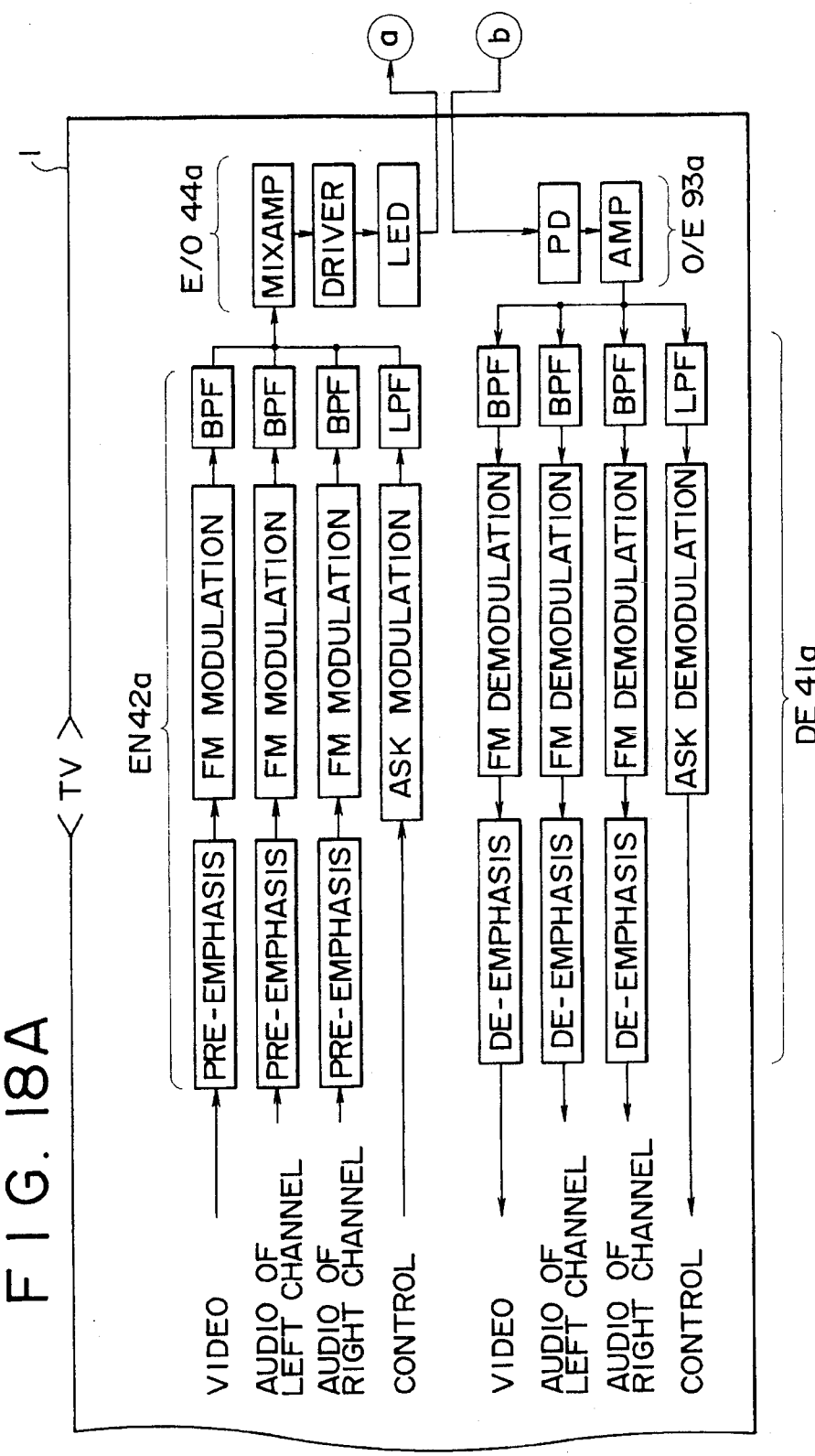
FIGS. 18A & 18B are block diagrams showing a partial configuration of the embodiment shown in FIG. 16 in more detail.
Figure 18B:
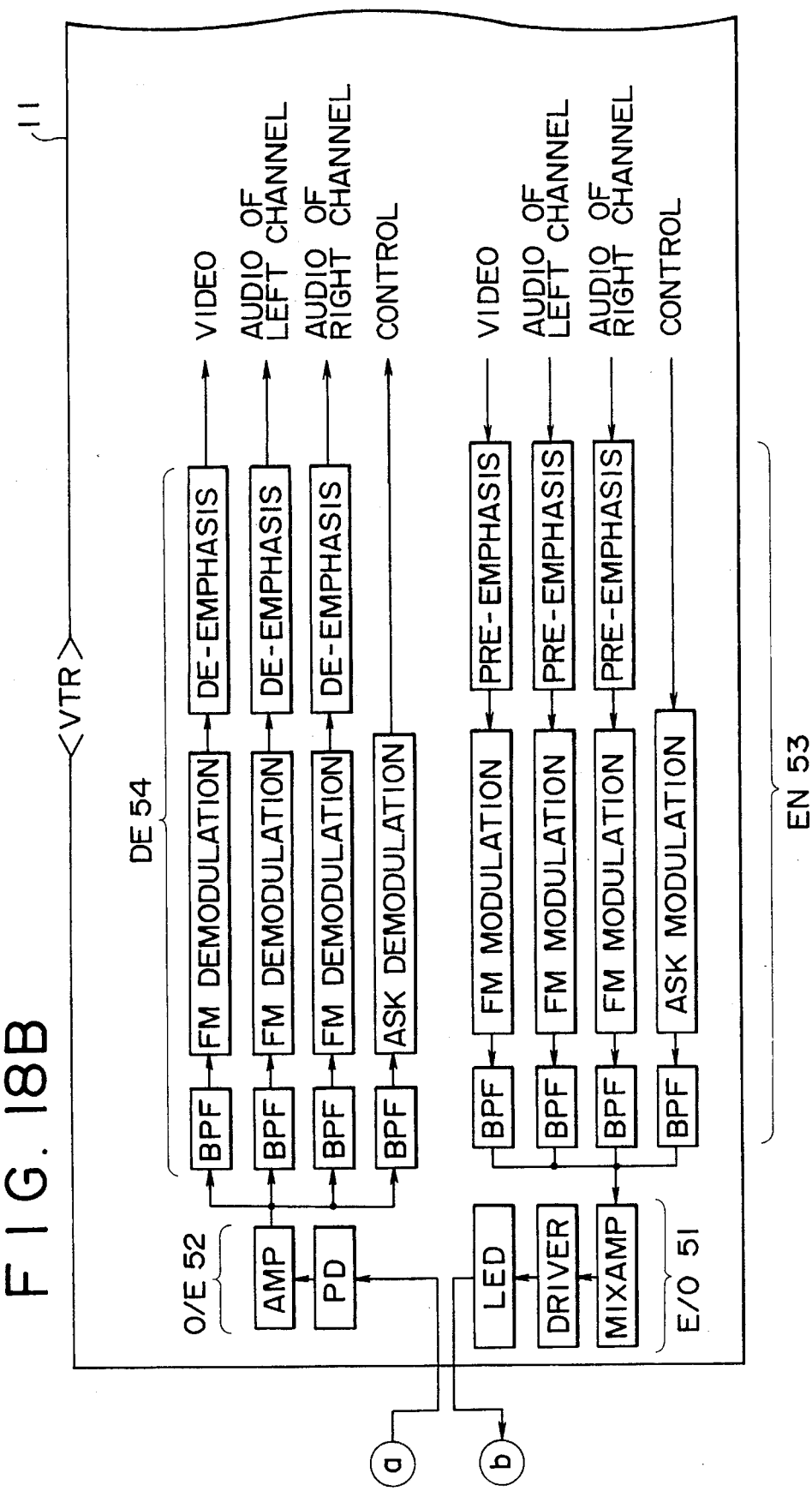

As shown in FIG. 18, the EN 42a (and also the ENs 42b and 42c shown in FIG. 16) each have three pre-emphasis circuits for emphasizing high frequency components of the video signal, the left-channel audio signal and the right-channel audio signal respectively. Signals output by the pre-emphasis circuits are then FM-modulated by FM modulation circuits before being supplied to BPFs (Band-Pass Filters) for filtering purposes. The control signal is, on the other hand, modulated by an ASK (Amplifier Shift Keying) circuit. A signal output by the ASK circuit is then supplied to an LPF (Low-Pass Filter) to be filtered.

As shown in FIG. 18, the video, audio and control signals filtered by the BPFs and the LPF employed in the EN 42a are output to the E/O 44a. It should be noted that, in the case of the ENs 42b and 42c, the filtered signals are output to the E/Os 44b and 44c shown in FIG. 16, respectively.

The E/O 44a includes a multiplexing circuit referred to as MIXAMP in FIG. 18 for multiplexing signals output by the EN 42a, i.e. the video signal, the left-channel audio signal, the right-channel audio signal and the control signal, with frequencies allocated as shown in FIG. 17. A multiplexed signal output by the MIXAMP circuit is then output to a driver for driving an LED. To be more specific, the driver controls the LED in accordance with the multiplexed signal. The LED, in turn, generates a light beam representing the multiplexed signal. The light beam is finally transmitted to the O/E 52 employed in the VTR 11 through the optical cable connecting the VTR 11 and the the TV 1.

As shown in FIG. 18, the O/E 52 comprises a PD (an optical detector) and an amplifier. It should be noted that the O/E 62 employed in the MDP 21 as shown in FIG. 16 has the same configuration as the O/E 52. First of all, the optical detector PD converts the light beam coming from the TV 1 into an electrical signal, the original multiplexed signal described above. The multiplexed signal is then amplified by the amplifier before being supplied to the DE 54.

The DE 54 has a configuration shown in FIG. 18. First of all, a signal output by the amplifier is filtered by BPFs and an LPF. The video signal, the left-channel audio signal, the right-channel audio signal and the control signal having frequency allocation shown in FIG. 17 are thereby fetched.

The video signal, the left-channel audio signal and the right-channel audio signal undergo FM demodulation at FM demodulation circuits before being de-emphasized at de-emphasis circuits. Signals output by the de-emphasis circuits are then supplied to the VTR blocks of the VTR 11. The control signal, on the other hand, undergoes ASK demodulation at an ASK demodulation circuit before being converted into, typically, an active-high signal. The active-high control signal is then supplied to the microcomputer 12 employed in the VTR 11.

It should be noted that the DE 64 of the MDP 21 shown in FIG. 16 is a block comprising only an LPF for fetching a control signal and an ASK demodulation circuit for carrying out ASK demodulation on a signal output by the LPF. In other words, unlike the DE 54 employed in the VTR 11, the DE 64 does not include BPFs and FM demodulation circuits. This is because the MDP blocks of the MDP 12 do not have a recording function as described before.

Next, let a multiplexed signal be transmitted inversely from the VTR 11 to the TV 1, for example. A video signal, a left-channel audio signal and a right-channel audio signal from the VTR blocks of the VTR 11 and a control signal from the microcomputer 12 employed in the VTR 11 are supplied to the EN 53.

As shown in FIG. 18, the EN 53 (and also the EN 63 shown in FIG. 16) each have three pre-emphasis circuits for emphasizing high frequency components of the video signal, the left-channel audio signal and the right-channel audio signal, respectively. Signals output by the pre-emphasis circuits are then FM-modulated by FM modulation circuits before being supplied to BPFs for filtering purposes. The control signal is, on the other hand, modulated by an ASK circuit. A signal output by the ASK circuit is then supplied to an LPF (Low-Pass Filter) to be filtered.

As shown in FIG. 18, the video, audio and control signals filtered by the BPFs and the LPF employed in the EN 53 are output to the E/O 51. In the case of the EN 63, the filtered signals are output instead to the E/O 61 shown in FIG. 16.

The E/O 51 includes a multiplexing circuit referred to as MIXAMP in FIG. 18 for multiplexing signals output by the EN 53, i.e. the video signal, the left-channel audio signal, the right-channel audio signal and the control signal, with frequencies allocated as shown in FIG. 17. A multiplexed signal output by the MIXAMP circuit is then output to a driver for driving an LED. To be more specific, the driver controls the LED in accordance with the multiplexed signal. The LED, in turn, generates a light beam representing the multiplexed signal. The light beam is finally transmitted to the O/E 43a employed in the TV 1 through the optical cable connecting the VTR 11 and the TV 1.

As shown in FIG. 18, the O/E 43a comprises a PD (an optical detector) and an amplifier. It should be noted that the O/Es 43b and 43c shown in FIG. 16 also have the same configuration as the O/E 43a. First of all, the optical detector PD converts the light beam coming from the VTR 11 into an electrical signal, the original multiplexed signal described above. The multiplexed signal is then amplified by the amplifier before being supplied to the DE 41a.

The DE 41a has a configuration shown in FIG. 18. First of all, a signal output by the amplifier is filtered by BPFs and an LPF. The video signal, the left-channel audio signal, the right-channel audio signal and the control signal having frequency allocation shown in FIG. 17 are thereby fetched. It should be noted that the DEs 41b and 41c shown in FIG. 16 also have the same configuration as the DE 41a.

The video signal, the left-channel audio signal and the right-channel audio signal undergo FM demodulation at FM demodulation circuits before being de-emphasized at de-emphasis circuits. Signals output by the de-emphasis circuits are then supplied to the selector 4 shown in FIG. 16. The control signal, on the other hand, undergoes ASK demodulation at an ASK demodulation circuit before being converted into, typically, an active-high signal. The active-high control signal is then supplied to the microcomputer 2 through a control bus 9.

As described above control, video and audio signals are multiplexed before being transmitted and received as a single signal, allowing the number of signal lines constituting a cable connecting two pieces of AV equipment to be reduced. As a result, pieces of AV equipment can be connected to each other with ease.

On top of that, the number of transmission errors due to, among other causes, noise generated in the course of transmission of signals among pieces of AV equipment connected to each other by optical cables as described above can also be reduced as well.

A case in which the present invention is applied to the TV 1 has been explained so far. In addition to the TV 1, the present invention can also be applied to other kinds of AV equipment such as the VTR 11 and the MDP 21. It should be noted that the present invention does not have to be applied to all pieces of AV equipment constituting an AV system. Instead, the present invention can be applied only to one of the pieces of the AV equipment.

An embodiment implementing an AV system comprising the TV 1 adopting the present invention, the VTR 11, and the MDP 21 connected to each other has been described. It should be noted, however, that the present invention can be applied not only to AV equipment such as the TV 1 but also to all apparatuses capable of transmitting and receiving control signals.

To be more specific, the present invention can be applied to verification of connection of apparatuses such as telephones and electric-lamp controllers which are capable of transmitting and receiving control signals even though not capable of transmitting and receiving video and audio signals like AV equipment.

In addition, the present invention has been explained through an example of verifying connection wherein control signals each inquiring a power status are exchanged. It should be noted, however, that applications of the present invention are not limited to such a control signal. The present invention can also be applied to verification of connection by using other kinds of control signal.

On top of that, video, audio and control signals exchanged among pieces of AV equipment can be analog or digital signals.

Furthermore, the modulation method adopted in an AV system exchanging video, audio and control signals as a multiplexed signal can be analog or digital modulation.

Figure 19:
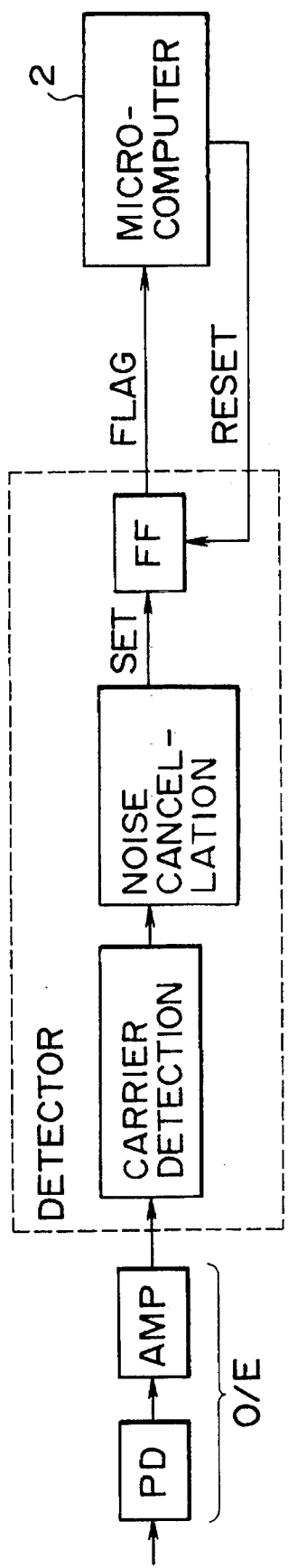
FIG. 19 is a diagram used for showing a method of detecting a control signal from a multiplexed signal adopted in the embodiment shown in FIG. 16.

In addition, in the TV 1 of the embodiment shown in FIG. 16, control signals are detected by the detectors 7a to 7c which each have a configuration shown in FIG. 4 as explained before. It should be noted that, in this case, the detectors 7a to 7b can also comprise a carrier detecting circuit, a noise canceling circuit and a flip-flop as shown in FIG. 19. The detectors 7a to 7c detect control signals from multiplexed signals output by the OEs 43a to 43c, respectively.

A control signal is detected from a multiplexed signal as follows. When a control signal is active, a carrier exists at a 40-kHz frequency position as shown in FIG. 17. There, first of all, the carrier is detected by the carrier detecting circuit. As the carrier is detected by the carrier detecting circuit, a high-level signal is supplied to the flip-flop through the noise canceling circuit for removing noise from the signal. The flip-flop latches the high-level signal received from the carrier detecting circuit, supplying it to the microcomputer 2. The detector shown in FIG. 19 detects a control signal from a multiplexed signal in the way described above.

In addition, the plug $P_{MDP}$ employed in the MDP 21 as shown in FIG. 1 can also be configured to comprise only the actually required six pins: a control-signal input pin, a control-signal output pin, a video-signal output pin, an audio-signal output pin for the left channel, an audio-signal output pin for the right channel and a GND (ground) pin. In this case, however, it is necessary to adapt the MDP-side connector of the cable Cb to the plug $P_{MDP}$ which comprises only the six pins.

An AV selector according to the present invention adopted in a system, wherein a plurality of connectors are each connected to a piece of AV equipment and control video as well as audio signals so that can be exchanged among the pieces of AV equipment through multiline cables connected to the connectors or as multiplexed signals, allows a particular piece of AV equipment connected to a connector to be identified by detecting the connector inputting a control signal transmitted by the particular piece of AV equipment and stores information on pairs each comprising a connector and AV equipment connected to the connector in a storage means. In addition, a switching means is provided for changing connection among the pieces of AV equipment on the basis of control signals and information stored in the storage means. As a result, pieces of AV equipment can each be identified and connection among the pieces of AV equipment can be changed correctly no matter what kinds of AV equipment are connected to the connectors.

Further, an AV selector according to the present invention allows a control means allows to control operations of any particular piece of AV equipment by performing control for outputting a control signal for the particular piece of AV equipment and requesting the particular piece of AV equipment to transmit a control signal on the basis of information stored in a storage means so that pieces of AV equipment can operate in a correctly interlocked manner.

Furthermore, an AV selector according to the present invention allows a control means to perform control for outputting a control signal for a particular piece of AV equipment immediately after power-on, preventing the user from feeling irritated during verification of connection.

An AV selector according to claim 4 allows information stored in a storage means to be displayed to notify the user of the current state of connection.

What is claimed is:

1. In a system comprising a central control device and plurality of operation devices for connection to said central control device, wherein said central control device and said plurality operation devices can each output and/or input video and/or audio signals and operate in an interlocked manner by exchanging control signals among said central control device and said plurality of operation devices, the improvement wherein:

said central control device comprises
first control means for generating a first control signal requesting each of said plurality of operation devices to transmit to said central control device a second control signal indicating a status of each of said operation devices and outputting the first control signal to each of said operation devices for preforming an initialization operation,
a plurality of identical first connectors for exchanging the control, video and audio signals with said plurality of operation devices, and
storage means for storing plug information identifying each of said plurality of first connectors and information relating to addresses of each of said plurality of operation devices corresponding to respective ones of said first connectors connected respectively to said plurality of operation devices; and said plurality of operation devices each comprise
a second connector for connection to any one of said plurality of identical first connectors for exchanging the respective control, video and audio signals with said central control device and
second control means for generating the second control signal for indicating a status of said operation device in response to the first control signal and outputting the second control signal to said central control device; wherein when said first control means receives the second control signal, said operation device outputting the second control signal is judged to be connected to said central control device and said storage means stores pairs of said plug information and operation device addresses for indicating a specific operation device connected to a specific plug.

2. The system comprising a central control device and operation devices according to claim 1 wherein the pair of the operation device address of the specific operation device outputting the second control signal and the plug information is catalogued as a table in a temporary memory portion of said storage means when the second control signal is received by said first control means.

3. The system comprising a central control device and operation devices according to claim 2 wherein said storage means of said central control device includes a ROM unit for storing said operation device addresses of said plurality of operation devices connectable to said central control device and said first control means outputs the first control signal to each of the operation devices associated with addresses read out from said ROM unit.

4. The system comprising a central control device and operation devices according to claim 3 wherein, when addresses of said operation devices are stored in said storage means, said first control means transmits the first control signal to each of said stored operation devices and the respective address of said stored operation device is deleted from said storage means if the second control signal is not received from said stored operation device.

5. The system comprising a central control device and operation devices according to claim 2 wherein, when an uncataloged operation device not catalogued is stored in said storage means, said first control means transmits the first control signal to said uncatalogued operation device and a corresponding address of said uncatalogued operation device is catalogued into said storage means if the second control signal is received from said uncatalogued operation device.

6. The system comprising a central control device and operation devices according to claim 5 wherein the first control signal is transmitted by said first control means to a connected operation device and said connected operation device is judged to be not catalogued in said storage means if the second control signal is not received from said connected operation device.

7. A central control device for exchanging video, audio and control signals with a plurality of operation devices connectable thereto, said central control device comprising
first control means for generating a first control signal requesting each of said plurality of operation devices to transmit to said central control device a second control signal indicating a status of each of said operation devices and outputting the first control signal to each of said operation devices upon performing an initialization operation,
a plurality of identical connectors for exchanging the control, video and audio signals with respective ones of said plurality of operation devices connected thereto, and
storage means for storing plug information identifying each of said plurality of identical connectors and information relating to addresses of said plurality of operation devices as pairs identifying specific ones of said connectors associated with specific ones of said plurality of operation devices.

8. The central control device according to claim 7 wherein said storage means of said central control device includes a ROM unit for storing said addresses of said plurality of operation devices connected to said central control device and said first control means outputs the first control signal to each of the operation devices associated with addresses read out from said ROM unit.

9. The central control device according to claim 8 wherein, for addresses of said operation devices stored in said storage means, said first control means transmits the first control signal to each of said stored operation devices and the respective address of said stored operation device is deleted from said storage means if the second control signal to be transmitted from said stored operation device is not received.

10. The central control device according to claim 7 wherein, when an address of one of said plurality of operation device is not stored in said storage means, said first control means transmits the first control signal to said one operation device and a corresponding address of said one operation device is stored into said storage means if the second control signal to be transmitted from said one operation device is received.

11. The central control device according to claim 10 wherein the first control signal is transmitted by said first control means to a connected operation device and said connected operation device is judged to be not stored in said storage means if the second control signal to be transmitted from said connected operation device is not received.

12. An operation device for exchanging video, audio and control signals with a central control device connected to said operation device, said operation device comprising
a connector for connection to any one of a plurality of compatible connectors connected to said central control device for exchanging the control, video and audio signals with said central control device and
control means for generating an operation device control signal for indicating a status of said operation device and outputting the operation device control signal to said central control device in response to a central control signal received from said central control device, which requests each of said operation devices to transmit the operation device signal indicating a status of each of said operation devices to said central control device.

* * * * *

UNITED STATES PATENT AND TRADEMARK OFFICE
CERTIFICATE OF CORRECTION

PATENT NO. : 5,621,659
DATED : April 15, 1997
INVENTOR(S) : Kazutoshi Matsumoto, Hatsuhiko Shinoda, Yosuke Yukihira, and Hiroshi Moriuchi It is certified that error appears in the above-indentified patent and that said Letters Patent is hereby corrected as shown below:

Col.4, line 6, change "device" to --devices--
Col.6, line 51, change "PVTR" to --$P_{VTR}$--
    same line, change "Of" to --of--
Col.10, line 37, change "Of" to --of--
Col.11, line 57, delete "or not"
Col.20, line 35, change "TV1" to --TV 1--
    line 54, after "signal" insert --,--

In the claims:
Col.26, line 14, change "device" to --devices--

Signed and Sealed this

Twenty-third Day of June, 1998

Attest:

BRUCE LEHMAN

*Attesting Officer*     Commissioner of Patents and Trademarks